US012610208B2

(12) United States Patent
Choueiri et al.

(10) Patent No.: US 12,610,208 B2
(45) Date of Patent: Apr. 21, 2026

(54) SYSTEM FOR GENERATING SOUND WAVES FOR AT LEAST TWO SEPARATE ZONES OF A SINGLE SPACE AND ASSOCIATED METHOD

(71) Applicants: The Trustees of Princeton University, Princeton, NJ (US); Focal jmlab, La talaudiere (FR)

(72) Inventors: Edgar Choueiri, Princeton, NJ (US); Rahulram Sridhar, Medford, MA (US); Joseph G Tylka, Pennington, NJ (US); Léo Guadagnin, Saint-Etienne (FR)

(73) Assignees: The Trustees of Princeton University, Princeton, NJ (US); FOCAL JMLAB, La Talaudiere (FR)

( * ) Notice: Subject to any disclaimer, the term of this patent is extended or adjusted under 35 U.S.C. 154(b) by 241 days.

(21) Appl. No.: 18/698,642

(22) PCT Filed: Oct. 4, 2022

(86) PCT No.: PCT/EP2022/077546
§ 371 (c)(1),
(2) Date: Apr. 4, 2024

(87) PCT Pub. No.: WO2023/057436
PCT Pub. Date: Apr. 13, 2023

(65) Prior Publication Data

US 2024/0334152 A1 Oct. 3, 2024

(30) Foreign Application Priority Data

Oct. 6, 2021 (FR) ....................................... 2110607

(51) Int. Cl.
*H04R 3/04* (2006.01)
*H04R 1/40* (2006.01)
(Continued)

(52) U.S. Cl.
CPC ............. *H04S 7/307* (2013.01); *H04R 1/403* (2013.01); *H04R 3/04* (2013.01); *H04R 3/14* (2013.01);
(Continued)

(58) Field of Classification Search
CPC ...... H04R 3/04; H04R 2201/403; H04R 3/12; H04R 1/403; H04R 2201/405;
(Continued)

(56) References Cited

U.S. PATENT DOCUMENTS 11,206,504 B2 * 12/2021 Stringer .................. H04R 3/12
11,363,402 B2 * 6/2022 Claar ...................... H04S 7/304
(Continued)

FOREIGN PATENT DOCUMENTS

WO WO-2016/008621 A1 1/2016

OTHER PUBLICATIONS

ISA/EPO International Search Report and Written Opinion for corresponding International Application No. PCT/EP2022/077546 dated Jan. 20, 2023 (16 pages).
(Continued)

*Primary Examiner* — Disler Paul
(74) *Attorney, Agent, or Firm* — Harris Beach Murtha Cullina PLLC

(57) ABSTRACT

The invention relates to a system for generating sound waves for at least two separate zones of a single space. The system includes, for each zone of said space: at least one array of high-frequency loudspeakers forming a directional sound wave; and at least one low-frequency loudspeaker. The system also comprises means for audio processing of the signals transmitted to the loudspeakers, which means control at least one loudspeaker to generate destructive sound waves in at least one zone of said space and to obtain distinct sound contents in said at least two distinct zones of said space. To do this, the audio-processing means control each low-frequency loudspeaker individually and each array of high-frequency loudspeaker mutually in order to generate the destructive sound waves.

9 Claims, 19 Drawing Sheets

(51) Int. Cl.
*H04R 3/14* (2006.01)
*H04S 7/00* (2006.01)
*H04R 3/12* (2006.01)

(52) U.S. Cl.
CPC .............. *H04S 7/301* (2013.01); *H04S 7/303* (2013.01); *H04R 3/12* (2013.01); *H04R 2201/403* (2013.01); *H04S 2420/07* (2013.01)

(58) Field of Classification Search
CPC . H04R 2430/20; H04S 2420/07; H04S 7/303; H04S 7/307; H04S 7/301
See application file for complete search history.

(56) References Cited

U.S. PATENT DOCUMENTS

| | | | | |
|---|---|---|---|---|
| 11,462,200 | B2 * | 10/2022 | Osako | H04R 1/403 |
| 11,516,614 | B2 * | 11/2022 | Lee | H04S 3/008 |
| 2014/0348354 | A1 * | 11/2014 | Christoph | H04R 29/001<br>381/303 |
| 2016/0142852 | A1 | 5/2016 | Christoph | |
| 2019/0200132 | A1 | 6/2019 | Horbach | |

OTHER PUBLICATIONS

International Preliminary Report on Patentability for corresponding International Application No. PCT/EP2022/077546 dated Mar. 26, 2024 (9 pages).

* cited by examiner

Art antérieur

Art antérieur

SYSTEM FOR GENERATING SOUND WAVES FOR AT LEAST TWO SEPARATE ZONES OF A SINGLE SPACE AND ASSOCIATED METHOD

CROSS-REFERENCE TO RELATED APPLICATIONS

This application is a national stage application under 35. U.S.C. § 371 of PCT Application No. PCT/EP2022/077546, filed on Oct. 4, 2022, which claims priority to, and the benefit of, French Application No. 2110607 filed on Oct. 6, 2021, the entire contents of each application being incorporated herein by reference thereto.

TECHNICAL AREA

The invention relates to the field of sound wave generation systems allowing providing sound to a plurality of distinct zones of the same space. The invention also relates to a method for determining the associated filters.

The invention can be applied to a large number of technical fields for which it is desired to provide sound to several distinct zones of the same space, such as a cinema hall broadcasting a film in several languages simultaneously, a vehicle in which several passengers listen to different sound contents, an open-air concert zone around which local residents are protected from noise pollution . . .

PRIOR TECHNIQUES

The creation of zones receiving different sound contents within the same space is a problem that has generated a lot of interest in recent years. Within the meaning of the invention, a "space" may correspond to a space delimited by real or virtual boundaries, such as a car interior or a district of a city. Similarly, a "zone" is generally demarcated by virtual boundaries, like for example a sound bubble around a building or around a listener's head.

In general, to control sound propagation within the different zones of the space, it is known to place physical acoustic barriers between the different zones and/or to install loudspeakers as close as possible to each zone and while limiting the propagation of the sound waves they generate.

When these two methods cannot be implemented, for example because the different zones are too close and/or the sound power expected in one zone is too high, it is possible to use sound processing means allowing controlling the propagation of sound waves to a target zone, while limiting the noise pollution induced in other zones with different sound levels.

To do this, as illustrated in FIG. 1, one solution consists in forming at least one directional sound beam Os1, Os2 by means of an alignment of loudspeakers HP1 arranged in a given space 1000. These are oriented, physically or by the addition of temporal delays, in the direction of a target zone to be sound reinforced Z1, Z2.

In order to create an array of directional loudspeakers, the loudspeakers HP1 constituting the array R1 are spaced apart by a distance less than half the maximum of the wavelengths generated by the loudspeakers HP1 so as to obtain constructive interferences and to form a substantially cylindrical sound wave. The formation of a directional sound beam, also called "beamforming" in the Anglo-Saxon literature, may be obtained from an array of aligned loudspeakers, also known as "line-array" in the Anglo-Saxon literature.

When several signals U1, U2 are transmitted to the same array R1, it is possible to direct, in space, each sound content within distinct beams Os1, Os2, while adapting the temporal delays at the input of each constituent loudspeaker of the array. This technique is called "beam steering" in the Anglo-Saxon literature. However, to obtain satisfactory sound quality at low frequencies, woofers are generally bulky, which complicates integration thereof in the form of arrays. Furthermore, the distance between the loudspeakers in an array should be adapted according to the frequency range generated by those loudspeakers. More clearly, to form an array of directional loudspeakers, the distance between high-frequency loudspeakers is smaller than the distance between woofers. Thus, installing an array of woofers in the passenger compartment of a car turns out to be almost impossible.

Another solution consists in controlling the sound reinforcement of several zones of the same space by filtering the signals transmitted to the loudspeakers to generate destructive interferences. These destructive interferences limits the propagation of the sound waves outside the target zones. This method is known as "Crosstalk cancellation" in the Anglo-Saxon literature, meaning "cancellation of cross-talks".

To do this, as illustrated in FIG. 2 of the prior art, a loudspeaker HP3, HP4 may be associated with each sound reinforcement zone Z3, Z4 of the space 2000. A first loudspeaker HP3 is responsible for sound reinforcing the first target zone Z3 whereas a second loudspeaker HP4 is responsible for sound reinforcing the second target zone Z4.

However, without any prior processing, the loudspeakers HP3 and HP4 emit sound waves in the direction of all zones Z3, Z4.

Thus, the first loudspeaker HP3 emits an acoustic wave perceived both at the zone Z3, and whose transfer function is denoted Os5, and at the same time at the zone Z4, whose transfer function is denoted Os6. Similarly, the second loudspeaker HP4 emits an acoustic wave at the zone Z3 whose transfer function is denoted Os3 and at the same time at the zone Z4 whose transfer function is denoted Os4.

The sound propagation matrix which relates the acoustic pressure induced by the different waves in the zones Z3 and Z4 and the signals U3 and U4 sent to each loudspeaker HP3, HP4 can then be written in the form:

$$\begin{pmatrix} Z3 \\ Z4 \end{pmatrix} = \begin{pmatrix} Os_5 & Os_3 \\ Os_6 & Os_4 \end{pmatrix} \begin{pmatrix} U3 \\ U4 \end{pmatrix} \quad \text{[Math1]}$$

To limit the noise pollution induced in the other zones Z3, Z4 provided with different sounds, each loudspeaker HP3, HP4 is associated with filtering F1, F2 controlling the generation of "destructive" sound waves to cancel undesirable sound waves Os6, Os3. Within the meaning of the invention, each loudspeaker HP3, HP4 conventionally forms a sound wave which can be virtually subdivided into an expected sound wave in a zone Z3, Z4 and possibly undesirable and/or destructive sound waves Os6, Os3. An "undesirable" sound wave Os6, Os3 corresponds to a sound wave that we do not want to see reach the zones Z3, Z4. A "destructive" sound wave corresponds to a sound wave configured to generate destructive interferences at a target zone such that the undesirable sound waves Os6, Os3 and the destructive sound waves cancel each other out, at least for the most part.

To do this, the filters F1, F2 receive as input the two signals U3, U4 representing the sound contents expected respectively in the two zones Z3, Z4. Depending on the evolution of these signals U3, U4 over time, each filter F1, F2 determines the signal S1, S2 to be transmitted to its loudspeaker HP3, HP4, so that this loudspeaker HP3, HP4 generates sound waves allowing sound reinforcing its target zone Z3, Z4 as well as destructive sound waves allowing limiting, at least in part, the sound waves Os6, Os3 generated by the other loudspeaker HP3, HP4 and which are broadcast in the direction of the wrong zone Z3, Z4.

More specifically, the filters F1, F2 are formed of different components, each component being intended to filter the corresponding input signal U3, U4.

For example, the filters F1, F2 may be written in the form of row matrices, as illustrated hereinbelow:

$$F1 = (F_{11}\ F_{12}) \quad \text{[Math2]}$$

and $$F2 = (F_{21}\ F_{22})$$

Thus, the signals S1 and S2 at the input of the loudspeakers HP3, HP4, receive the signals U3, U4. The signals S1 and S2 could then be written in the following form:

$$\begin{pmatrix} S1 \\ S2 \end{pmatrix} = \begin{pmatrix} F_{11} & F_{12} \\ F_{21} & F_{22} \end{pmatrix}\begin{pmatrix} U3 \\ U4 \end{pmatrix} = \begin{cases} F_{11}U3 + F_{12}U4 \\ F_{21}U3 + F_{22}U4 \end{cases} \quad \text{[Math3]}$$

The sound signals perceived in zones Z3 and Z4 are expressed from the propagation matrix and the input signal of the system such that:

$$\begin{pmatrix} Z3 \\ Z4 \end{pmatrix} = \begin{pmatrix} Os_5 & Os_3 \\ Os_6 & Os_4 \end{pmatrix}\begin{pmatrix} S1 \\ S2 \end{pmatrix} \quad \text{[Math4]}$$

$$\begin{pmatrix} Z3 \\ Z4 \end{pmatrix} = \begin{pmatrix} Os_5 & Os_3 \\ Os_6 & Os_4 \end{pmatrix}\begin{pmatrix} F_{11}U3 + F_{12}U4 \\ F_{21}U3 + F_{22}U4 \end{pmatrix}$$

$$\begin{pmatrix} Z3 \\ Z4 \end{pmatrix} = \begin{pmatrix} Os_5(F_{11}U3 + F_{12}U4) + Os_3(F_{21}U3 + F_{22}U4) \\ Os_6(F_{11}U3 + F_{12}U4) + Os_4(F_{21}U3 + F_{22}U4) \end{pmatrix}$$

In order to isolate the zones Z3 and Z4 from each other, the loudspeaker HP3 may be configured so that the audio content F22.U4 in the zone Z3, corresponding to the transfer function Os3, destructively interferes with the audio content F12.U4 propagated by the loudspeaker HP3 in the zone Z3. Similarly, the audio content F11.U3 emitted by the loudspeaker HP3 in the zone Z4, corresponding to the transfer function Os6, destructively interferes with the audio content F21.U3 emitted by the loudspeaker HP4 in the zone Z4, corresponding to the transfer function Os4. After filtering, the following matrix is obtained:

$$\begin{pmatrix} Z3 \\ Z4 \end{pmatrix} = \begin{pmatrix} Os_5 & 0 \\ 0 & Os_4 \end{pmatrix}\begin{pmatrix} U3 \\ U4 \end{pmatrix} \quad \text{[Math5]}$$

A solution may be obtained from the inversion of the following matrix:

$$\begin{pmatrix} F_{11} & F_{12} \\ F_{21} & F_{22} \end{pmatrix} = \begin{pmatrix} Os_5 & Os_3 \\ Os_6 & Os_4 \end{pmatrix}^{-1}\begin{pmatrix} Os_5 & 0 \\ 0 & Os_4 \end{pmatrix} \quad \text{[Math6]}$$

It follows that the sound waves perceived in the first target zone Z3 correspond mainly to those of the signal U3 and that the sound waves perceived in the second target zone Z4 correspond mainly to those of the signal U4.

This solution is particularly complex to implement, in particular when it is desired to reach high frequencies. Indeed, due to the spatial overlap phenomenon, particularly present at high frequencies, it is appropriate to use a larger number of loudspeakers to generate high frequencies with satisfactory sound quality. Yet, since each loudspeaker is connected to filtering wherein the number of filters depends on the number of loudspeakers, the more the number of loudspeakers increases, the larger the number of filter components will be.

Thus, this solution requires complex and bulky electronics, all the more so when the number of loudspeakers and filter components increases and/or when the loudspeakers controlled by the filters use high frequencies, typically higher than 1 kHz.

Hence, the technical problem that the invention aims to solve is to be able to generate sound waves for at least two distinct zones of the same space with satisfactory sound quality and robustness to movements, while limiting the bulk of the system, i.e. the number of loudspeakers and the complexity of the control electronics.

DISCLOSURE OF THE INVENTION

To address this technical problem, the invention proposes, for a given space, to generate low frequencies by filtering the signals transmitted to the woofers to generate destructive interferences, and to generate high frequencies thanks to at least one directional array of high-frequency loudspeakers for which a filter is shared in order to filter the signals transmitted to the array of high-frequency loudspeakers to generate destructive interferences.

Indeed, the invention arises from a discovery according to which an array can be modeled as a unique directional loudspeaker. Hence, it is possible to associate one single filter for an entire directional array without losing directionality. Thus, the use of a directional array associated with the generation of destructive waves allows reducing the number of filter components and, consequently, the complexity of the control electronics and the energy consumption of the system.

It follows that the control electronics are generally simplified and the system is therefore easier to integrate into reduced spaces where installation constraints are strong, like for example the passenger compartment of a car.

In other words, the invention relates to a system for generating sound waves for at least two distinct zones of the same space; said system including for each zone of said space:

- at least one array of high-frequency loudspeakers including at least three high-frequency loudspeakers so as to form at least one directional sound wave; and
- at least one low-frequency loudspeaker.

The system also includes means for audio processing the signals transmitted to the loudspeakers; said audio processing means controlling at least one loudspeaker to generate destructive sound waves in at least one zone of said space and obtain distinct sound contents in said at least two distinct zones of said space; each sound content of each zone resulting from the sum of the sound waves propagated in said zone.

The invention is characterized in that the audio processing means control each low-frequency loudspeaker individually and each array of high-frequency loudspeakers mutually to generate the destructive sound waves.

In a preferred embodiment, several zones of said space are sound reinforced by the same array of high-frequency loudspeakers forming at least two directional sound waves.

In other words, all of the high-frequency loudspeakers in the array can be used to sound reinforce the at least two zones at the same time by forming at least two distinct directional beams. In order to send the right sound signals to the right zones, time delays are applied to each high-frequency loudspeaker making up the array.

Surprisingly, the invention also allows obtaining better robustness to movements within zones of the space.

In practice, to calculate the coefficients of a filter controlling a loudspeaker to generate destructive interferences in a target zone, it is necessary to first estimate all of the signals generated in this zone. To do this, it is necessary to estimate the transfer functions between the different loudspeakers and the different zones for different frequencies. This estimation may be carried out by placing a microphone in the target zone or by performing a digital simulation from one or more control point(s) of this zone.

Within the meaning of the invention, a control point is a reference point located in a zone, for which the transfer function between the loudspeaker and the control point as well as the sound pressure at this point are known.

Upon completion of this step, the different transfer functions can be integrated into a matrix, called the propagation matrix.

The filter associated with the loudspeaker intended to transmit sound waves in the target zone is then calculated to cancel the transfer functions of the undesirable sound waves in the target zone.

By using this method for a large number of loudspeakers, the calculation of the cancellation of the transfer functions becomes spatially very localized, and that being so in particular for high frequencies. In other words, in the target zones, the constructive and destructive interferences of the acoustic waves is very localized around the control points.

One could then notice that this method is effective only when the listener is precisely placed at the control point of the target zone.

This method for calculating the filters induces optimum rendering at least at one control point of a target zone and considerable variations in the level of acoustic insulation for small variations in spatial position relative to this central point. Typically, a listener who moves his or her head a few centimeters from the control point of a zone would perceive significant variations in the sound level of undesirable signals originating from the programs of the other listeners. This drawback might make listening difficult and uncomfortable for the listener.

The invention allows addressing this problem because it allows the sound rendering to be optimum over a wider zone than in the prior art. Thus, the invention allows obtaining a more homogeneous rendering in the target zone. In other words, a listener who moves his or her head a few centimeters from the control point of a zone would not see any change in the quality of the sound he or she perceives. Hence, his or her listening experience is generally improved.

In a preferred embodiment, the space including at least four zones, the system comprises at least four directional sound waves and at least four low-frequency loudspeakers; said audio processing means controlling:

- each low-frequency loudspeaker associated with a target zone to generate destructive sound waves intended to limit the sound waves generated, in the target zone, by the low-frequency loudspeakers associated with other zones; and
- each array of high-frequency loudspeakers associated with a target zone to generate destructive sound waves intended to limit the sound waves generated, in the target zone, by the arrays of high-frequency loudspeakers associated with other zones.

Of course, the arrays of high-frequency loudspeakers can be used to generate a first sound wave intended for a first zone and a second sound wave intended for a second zone.

This embodiment allows replicating an effect of spatial distribution of the sound sources.

Within the meaning of the invention, the zones can be defined in a substantially two-dimensional (2D) space. This embodiment then allows obtaining stereophonic sound rendering for listeners, i.e. they can locate the sounds they perceive in the 2D space. To do this, distinct audio contents for each ear are sent through the loudspeakers, which helps improve the immersive experience for the listener.

Within the meaning of the invention, the zones may also be defined in a substantially three-dimensional (3D) space. This embodiment then allows obtaining a 3D sound rendering for the listeners, i.e. they can locate the sounds they perceive in the 3D space.

To do this, distinct audio contents for each ear are sent through the loudspeakers in order to obtain binaural sound rendering. Such sound rendering is the closest one to reality, it allows the listener to feel completely immersed in the space.

In order to distribute the signals between the low-frequency loudspeakers and the directional arrays of high-frequency loudspeakers, the audio processing means preferably include at least one low-pass filter and at least one high-pass filter allowing splitting the signal transmitted to the loudspeakers into at least one high-frequency signal transmitted to the arrays of high-frequency loudspeakers and at least one low-frequency signal transmitted to the low-frequency loudspeakers.

In a particular embodiment, the system may include broadband loudspeakers, capable of reproducing both the high-frequency sounds of the high-frequency loudspeakers and the low-frequency sounds of the low-frequency loudspeakers.

It is then possible to simultaneously send to the broadband loudspeaker a signal indicating it to behave like a high-frequency loudspeaker constituting a directional array and a signal indicating it to behave like a low-frequency loudspeaker, without creating interferences between the two signals.

In other words, the system comprises at least one broadband loudspeaker constituting both a low-frequency loudspeaker and a high-frequency loudspeaker of an array, said broadband loudspeaker receiving at least one high-frequency signal and at least one low-frequency signal.

Thus, incorporating broadband loudspeakers allows limiting the total number of loudspeakers in the system, making it easier to install in tight spaces.

In practice, the system includes, for each zone of said space, between 2 and 6 low-frequency loudspeakers and an array including between 10 and 20 high-frequency loudspeakers.

In an advantageous embodiment, the system further includes means for detecting the position of the head of the user, the audio processing means controlling the at least one low-frequency loudspeaker and the at least one array of high-frequency loudspeakers to generate the destructive sound waves according to the position of the head of the user.

This tracking of the head of the user, also called "Head-tracking" in the Anglo-Saxon literature, allows applying, in real-time, a filter, previously calculated, which will generate the best sound rendering for the user, according to the position of his or her head. Hence, tracking the head of the user allows further increasing the robustness of the system.

According to another aspect, the invention relates to a method for determining at least one filtering matrix associated with at least one low-frequency loudspeaker and at least one array of high-frequency loudspeakers of the system as described before. The process includes the following steps:

- measuring and/or simulating a first propagation matrix between the different low-frequency loudspeakers and the different zones;
- measuring and/or simulating a second propagation matrix between the arrays of high-frequency loudspeakers and the different zones, each propagation matrix including the transfer functions between each low-frequency loudspeaker or array of high-frequency loudspeakers and each zone;
- determining a first objective matrix from the first propagation matrix by canceling the transfer functions in the zones intended to receive the destructive sound waves;
- determining a second objective matrix from the second propagation matrix by canceling the transfer functions in the zones intended to receive the destructive sound waves;
- calculating a first filtering matrix corresponding to the product of the inverse matrix of the first propagation matrix and the first objective matrix, and
- calculating a second filtering matrix corresponding to the product of the inverse matrix of the second propagation matrix and the second objective matrix.

In order to limit the computing power necessary for the system, it is possible to reduce the number of filters by calculating a common filtering matrix from the first and second filtering matrices. Thus, the common matrix includes information relating to both the directional arrays and the low-frequency loudspeakers. This calculation step is particularly useful when the system includes broadband loudspeakers which should receive both a filtered signal intended for the directional array and a filtered signal intended for the low-frequency loudspeakers.

In practice, the measurement or simulation of the first and/or the second propagation matrix may be carried out at least at one control point per zone.

One way to use it is to increase the number of control points within a zone. The objective matrix then requires obtaining the desired signal at each control point. Although this system increases the number of filters, the use of multiple control points allows homogenizing the sound insulation in the target zones. Thus, a better robustness with regards to the movements of the head of the user is obtained. If the insulation level is more homogeneous in the zone, it decreases with the number of control points and even more so if the zone covered by the control points is large. In other words, the measurement or simulation of the first and/or second propagation matrix may be carried out in at least two control points, the transfer functions between each low-frequency loudspeaker or array of high-frequency loudspeakers and each zone are obtained by calculating several filters for each control point located in the different zones.

In practice, the at least one filtering matrix is selected from a set of filtering matrices calculated for the different control points or set of control points, according to the position of the head of the user.

DESCRIPTION OF THE FIGURES

The manner for carrying out the invention, as well as the advantages that result therefrom, will appear clearly from the description of the embodiments that follow, in support of the appended figures wherein.

DETAILED DESCRIPTION OF THE EMBODIMENTS

Figure 1:
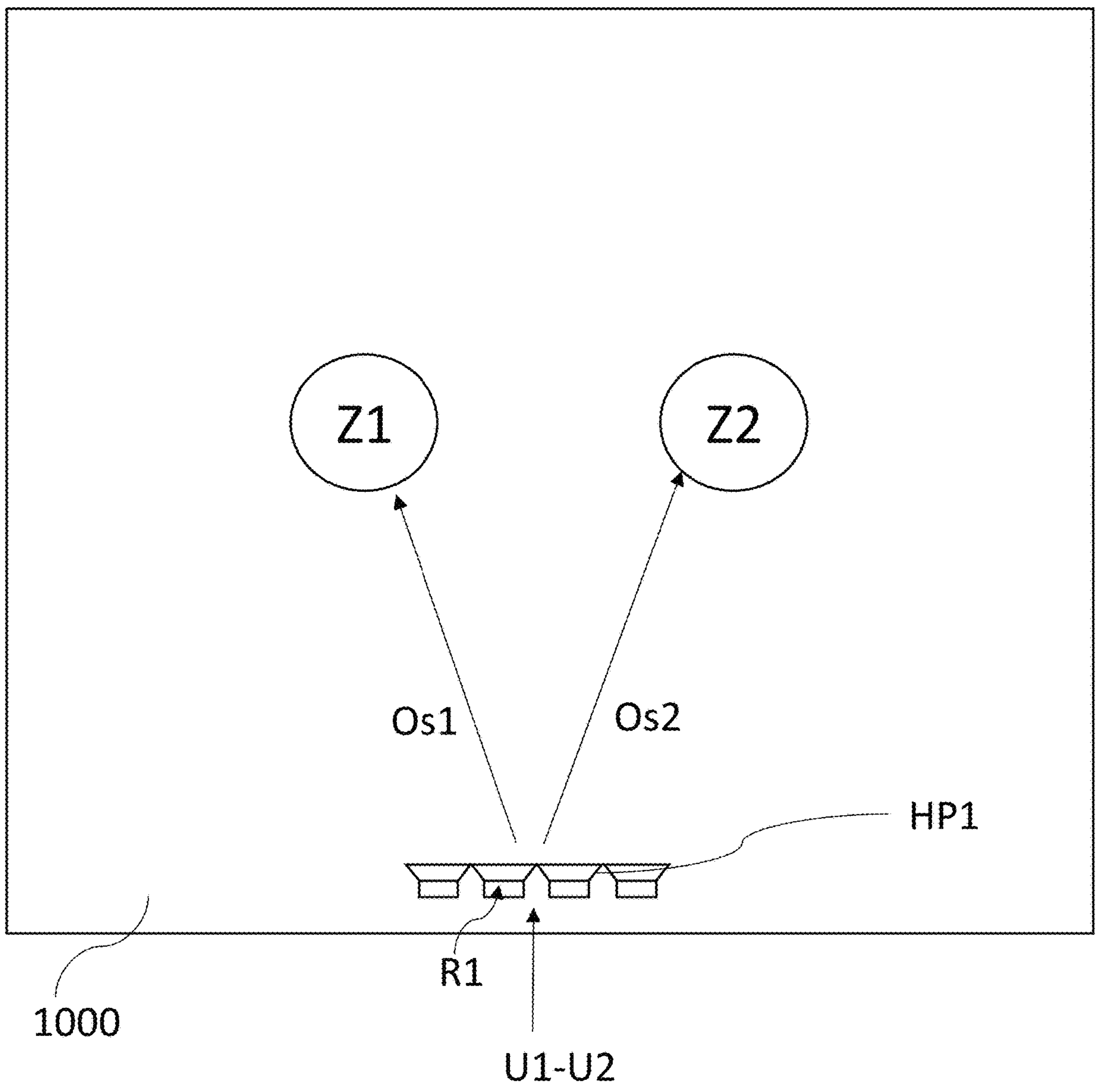
FIG. 1 is a schematic representation of a system of the prior art configured to sound reinforce two distinct zones of a space using an array of loudspeakers.
Figure 2:
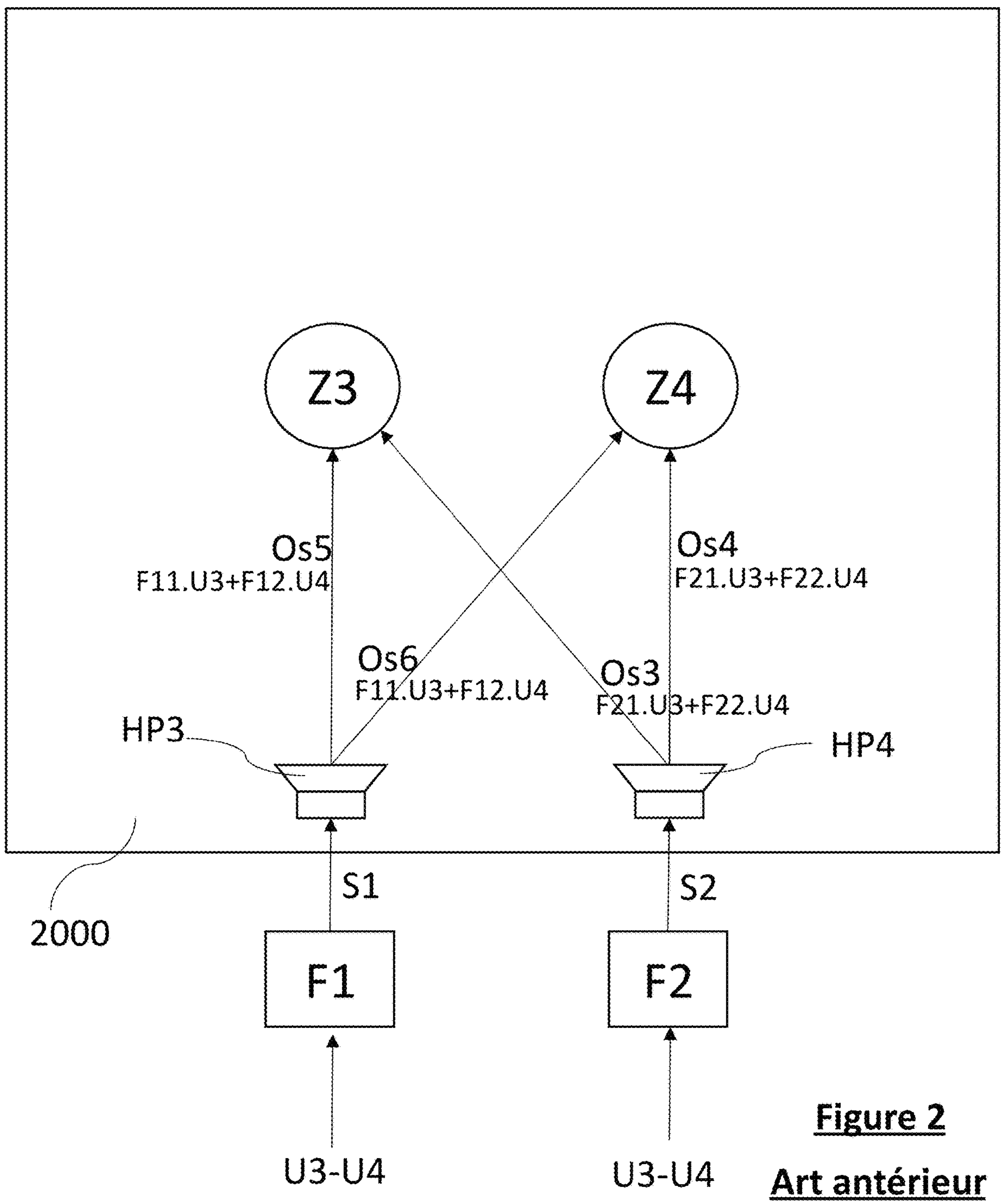
FIG. 2 is a schematic representation of a system of the prior art configured to sound reinforce two distinct zones of a space by generating destructive waves.
Figure 3:
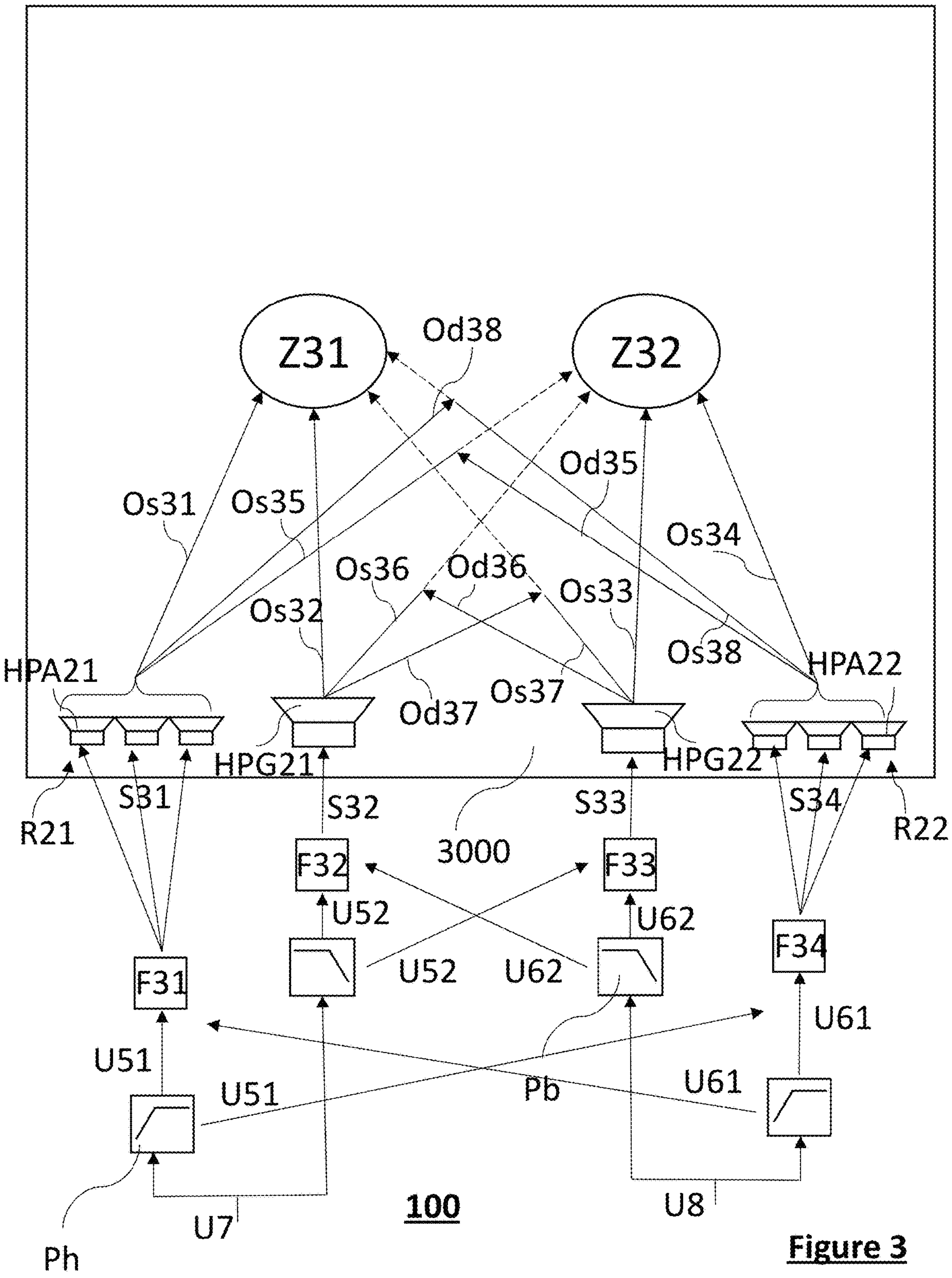
FIG. 3 is a schematic representation of the system of the invention according to a first embodiment.

As illustrated in FIG. 3, the system 100 of the invention can be integrated in or proximate to a space 3000 that should be sound reinforced. The space 3000 may have variable dimensions and be delimited, or not, by physical boundaries. For example, space 3000 may be the passenger compartment of a car, a cinema room, a concert hall or an open-air concert space.

Within the space 3000, it is possible to define zones Z31, Z32 for which it is desired to obtain a specific sound reinforcement.

For example, the zone Z31 may be a zone in which it is desired to maximize the sound intensity, whereas in the zone Z32, it is desired to minimize the sound intensity. For example, the space 3000 may include an open-air concert zone and its immediate vicinity. The zone Z31 may correspond to the interior of the open-air concert zone, this zone Z31 being intended to be sound reinforced by music of the concert. In turn, the zone Z32 may correspond to the exterior of the open-air concert zone. It is then sought to limit the sound intensity as much as possible in the zone Z32 so as not to disturb the neighborhood.

According to another example, the zone Z31 may be a zone in which it is desired to generate a sound content of a first type, whereas in the zone Z32, it is desired to generate a sound content of a second type. For example, the space 3000 may correspond to a cinema room, the zone Z31 may correspond to a first row of seats for which it is desired to broadcast a film in a first language and the zone Z32 may correspond to a second row of seats for which we wish to broadcast the film in a second language. Alternatively, the space 3000 may include more than two zones, typically between 3 and 20 distinct zones. In particular, the space 3000 may include "pairs of zones", i.e. zones spaced apart by between 15 and 25 cm to enable a user to position each of his or her ears in a distinct zone. The user can then receive different sound contents in each ear, which allows recreating a stereophonic or 3D sound effect.

In order to sound reinforce to these zones Z31, Z32, the system 100 includes loudspeakers HPG21, HPG22, HPA21, HPA22 arranged within the space 3000. For example, the loudspeakers HPG21, HPG22, HPA21, HPA22 may be arranged proximate the zones to be sound reinforced. Typically, the loudspeakers HPG21, HPG22, HPA21, HPA22 may be integrated into the seat of the user r into the back of a seat facing him or her, in the case of a row of seats. The loudspeakers HPG21, HPG22, HPA21, HPA22 may also be moved away from the zone to be sound reinforced, typically over a distance comprised between 0.5 m and 100 m. For example, the loudspeakers HPG21, HPG22, HPA21, HPA22 may be integrated into the walls and/or partitions of the space 3000 or mounted on a sound bar.

As illustrated in FIG. 3, for each zone Z31, Z32 of the space 3000, it is possible to associate a low-frequency loudspeaker HPG21, HPG22 and an array R21, R22 of three high-frequency loudspeakers HPA21, HPA22. Alternatively, the number of low-frequency loudspeakers HPG21, HPG22 may be comprised between 2 and 10.

Similarly, the number of high-frequency loudspeakers HPA21, HPA22 may be comprised between 2 and 30. In general, the arrays R21, R22 of high-frequency loudspeakers HPA21, HPA22 are formed of a set of high-frequency loudspeakers HPA21, HPA22 aligned and separated by a distance shorter than half the maximum of the wavelengths generated by the loudspeakers so as to obtain constructive interference and to form a substantially cylindrical sound wave. However, the arrays R21, R22 of high-frequency loudspeakers HPA21, HPA22 are not necessarily physically separated. It is possible to form sub-arrays and assign a different function thereto.

For example, an array R21, R22 of high-frequency loudspeakers HPA21, HPA22 may consist of 10 high-frequency loudspeakers HPA21, HPA22. Within this array R21, R22, 5 high-frequency loudspeakers HPA21, HPA22 may be assigned to the zone Z31, whereas the other 5 high-frequency loudspeakers HPA21, HPA22 are assigned to the zone Z32. Alternatively, the 10 high-frequency loudspeakers HPA21, HPA22 may be assigned to both the zone Z31 and the zone Z32. Two directional sound waves are then generated, intended for each zone Z31, Z32. Temporal delays may be applied to each high-frequency loudspeaker HPA21, HPA22 constituting the array R21, R22 to send the right sound signal to the right zone Z31, Z32.

A low-frequency loudspeaker HPG21, HPG22 typically emits in a frequency range comprised between 20 Hz and 2,000 Hz and a high-frequency loudspeaker HPA21, HPA22 typically emits in a frequency range comprised between 2,000 Hz and 40 kHz.

Figure 4:
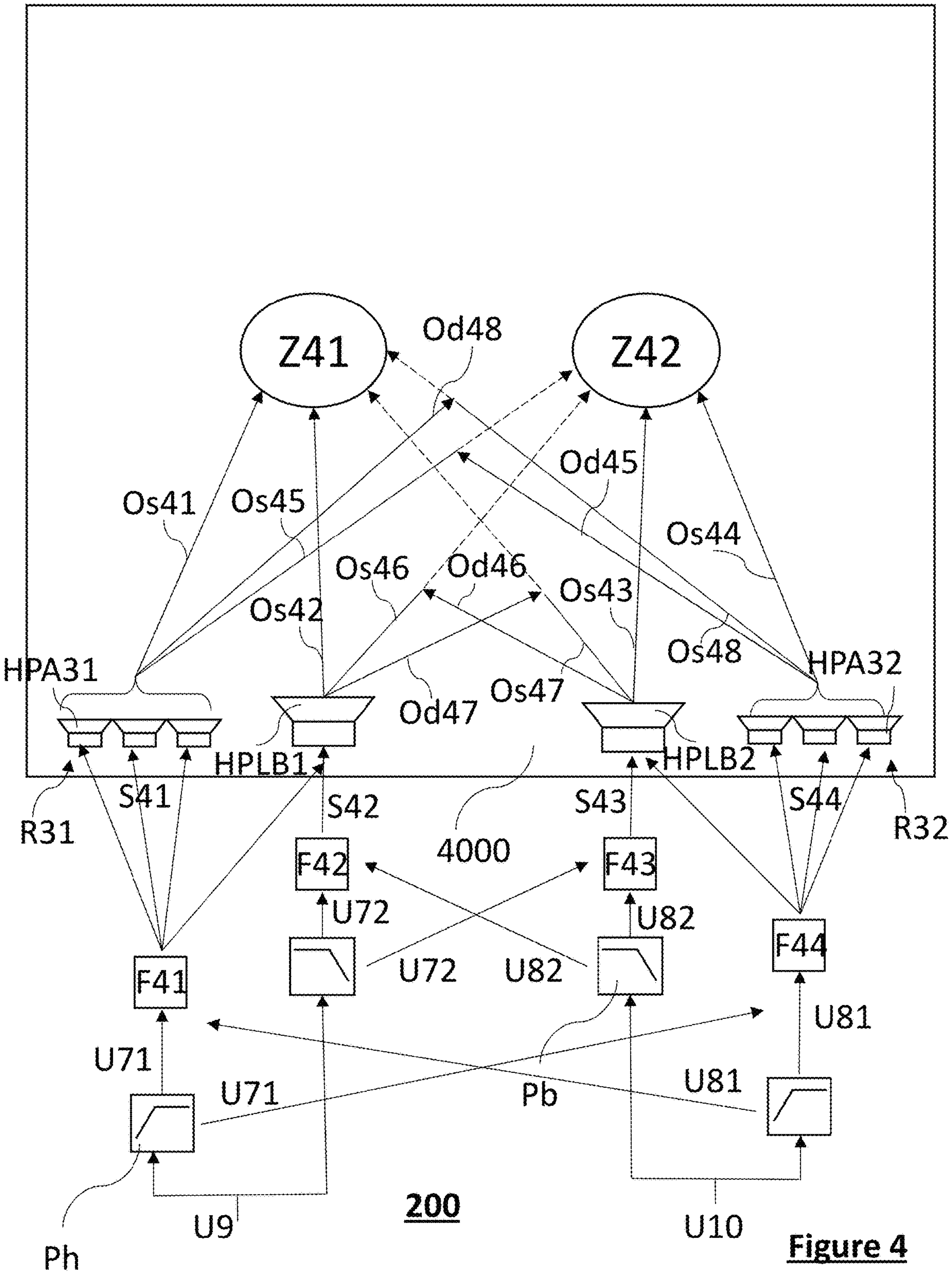
FIG. 4 is a schematic representation of the system of the invention according to a second embodiment.

Alternatively, as illustrated in FIG. 4, the system 200 may include broadband loudspeakers HPLB, emitting, in the space 4000, both in the low-frequency range and in the high-frequency range, i.e., typically over the entire bandwidth of the human ear, namely between 20 Hz and 20 kHz. The broadband loudspeakers HPLB may be an integral part of an array R31, R32 or operate independently.

As illustrated in FIG. 3, without any prior processing, the high-frequency loudspeakers HPA11, HPA12 and the low-frequency loudspeakers HPG21, HPG22 are not perfectly directional and can emit sound waves in the direction of zones Z31, Z32 other than those they are responsible for sound reinforcing. Thus, the first low-frequency loudspeaker HPG21 emits both a sound wave Os32 in the direction of its zone Z31 and a sound wave Os36 in the direction of the second zone Z32 and likewise, the second low-frequency loudspeaker HPG22 emits both a sound wave Os33 in the direction of its zone Z32 and a sound wave Os37 in the direction of the other zone Z31. Furthermore, the arrays of high-frequency loudspeakers R21, R22 are also not perfectly directional and also emit sound waves in the direction of the two zones Z31, Z32 at the same time. For example, the array of high-frequency loudspeakers R21 emits both a sound wave Os31 in the direction of its zone Z31 and a sound wave Os35 in the direction of the second zone Z32. Similarly, the array of high-frequency loudspeakers R22 emits both a sound wave Os34 in the direction of its zone Z32 and a sound wave Os38 in the direction of the zone Z31.

To limit noise pollution, each low-frequency loudspeaker HPG21, HPG22 and each array R21, R22 of high-frequency loudspeakers HPA21, HPA22 is associated with filtering F31-F34 controlling the generation of destructive sound waves Od35-Od38 to cancel undesirable sound waves Os35-Os38.

Thus, each low-frequency loudspeaker HPG21, HPG22 is associated with a filter F32, F33, which supplies the low-frequency loudspeakers HPG21, HPG22, respectively with the signals S32 and S33. On the other hand, the filter F31, F34 is shared for all of the high-frequency loudspeakers HPA11, HPA12. Thus, the filters F31, F34 respectively provide a signal S31 and S34 to the arrays of loudspeakers HPA21, HPA22.

The loudspeakers HPG21, HPG22, HPA21, HPA22 are powered by two electrical signals U7, U8. Preferably, the signals U7, U8 are filtered by a low-pass filter Pb with a cutoff frequency comprised between 400 Hz and 4 kHz and by a high-pass filter Ph with a cutoff frequency comprised between 400 Hz and 4 kHz in order to distinguish high frequencies and low frequencies. Thus, the low-frequency signals U52, U62 are transmitted to the filters F32, F33 of the low-frequency loudspeakers HPG21, HPG22 and the high-frequency signals U51, U61 are transmitted to the filters F31, F34 of the arrays R21, R22 of high-frequency loudspeakers HPA21, HPA22.

It follows that the sound contents obtained in the first target zone Z31 correspond predominantly to those expected by the signal U7 by the association:

- of the low-frequency sound waves Os32 formed by the first low-frequency loudspeaker HPG21 the signal S32 of which is configured to also generate destructive interferences Od37 to limit the sound waves Os37 formed by the second low-frequency loudspeaker HPG22; and
- of the high-frequency sound waves Os31 formed by the high-frequency loudspeakers HPA21 having a directionality obtained by the array R21 and generating destructive interferences Od38 to limit the sound waves Os38 formed by the second array R22 of high-frequency loudspeakers HPA22.

In the same manner, the sound contents obtained in the second target zone Z32 correspond predominantly to those expected by the signal U8.

As illustrated in FIG. 4, the system may comprise at least one broadband loudspeaker HPLB1 responsible for sound reinforcing the zone Z41 and at least one broadband loudspeaker HPLB2, for sound reinforcing the zone Z42. Similarly, the system may comprise at least one array R21, R22 of high-frequency loudspeakers to sound reinforce the zones Z41 and Z42 respectively. The broadband loudspeakers HPLB1 are also not perfectly directional and can emit sound waves in the direction of zones Z41, Z42 other than those they are responsible for sound reinforcing. Thus, the broadband loudspeaker HPLB1 emits both a sound wave Os42 in the direction of its zone Z41 and a sound wave Os46 in the direction of the second zone Z42. To limit sound pollution, each broadband loudspeaker HPLB1, HPLB2 and each array R21, R22 of high-frequency loudspeakers HPA21, HPA22 is associated with at least one filtering F41-F44 controlling the generation of destructive sound waves Od45-Od48 to cancel the undesirable sound waves Os35-Os38. For example, the broadband loudspeaker HPLB1 may be associated with two filters F41 and F42 controlling the generation of destructive sound waves Od47 to cancel the undesirable sound waves Os45-Os48. The first filter F41 is fed by the high-frequency part U71 of the electrical signal U9 and produces a signal S41 intended for the broadband loudspeaker HPLB1 and the array R31. The second filter F42 is fed by the low-frequency part U72 of the electrical signal U9 and produces a signal S42 intended for the broadband loudspeaker HPLB1. Similarly, the broadband loudspeaker HPLB2 may be associated with two filters F43 and F44 controlling the generation of destructive sound waves Od46 to cancel the undesirable sound waves Os45-Os48. The first filter F44 is fed by the high-frequency part U81 of the electrical signal U10 and produces a signal S44 intended for the broadband loudspeaker HPLB2 and the array R32 and the second filter F43 is fed by the low-frequency part U82 of the electrical signal U10 and produces a signal S43 intended for the broadband loudspeaker HPLB2.

In the example of FIG. 4, the broadband loudspeaker HPLB1 is used to sound reinforce the zone Z41 at low frequencies and to cancel the undesirable sound waves Os47 originating from the broadband loudspeaker HPLB2.

Alternatively, the broadband loudspeaker HPLB1 may be used to sound reinforce the zone Z41 at high frequencies, for example by forming an integral part of the array R31, and/or to cancel undesirable sound waves Os48 originating from the array of high-frequency loudspeakers HPA32. In still another variation, the broadband loudspeaker HPLB1 may play both roles at once or a combination of these roles. Similarly, the broadband loudspeaker HPLB2 is used to sound reinforce the zone Z42 at low frequencies and to cancel the undesirable sound waves Os47 originating from the broadband loudspeaker HPLB1. This broadband loudspeaker HPLB2 is connected to a second filter F43 fed by the low-frequency part U82 of the electrical signal U10.

Furthermore, the array R31 of high-frequency loudspeakers emits both a sound wave Os41 in the direction of its zone Z41 and a sound wave Os45 in the direction of the second zone Z42. Similarly, the array R32 of high-frequency loudspeakers emits both a sound wave Os44 in the direction of its zone Z42 and a sound wave Os48 in the direction of the zone Z41.

In order to configure the different filters, a filtering matrix C1, C2, C may be measured or simulated. This method of determining at least one filtering matrix C1, C2, C is associated with at least one low-frequency loudspeaker HPG21, HPG22, and at least one array of high-frequency loudspeakers HPA21, HPA22, HPA31, HPA32 of the system 100.

Figure 5:
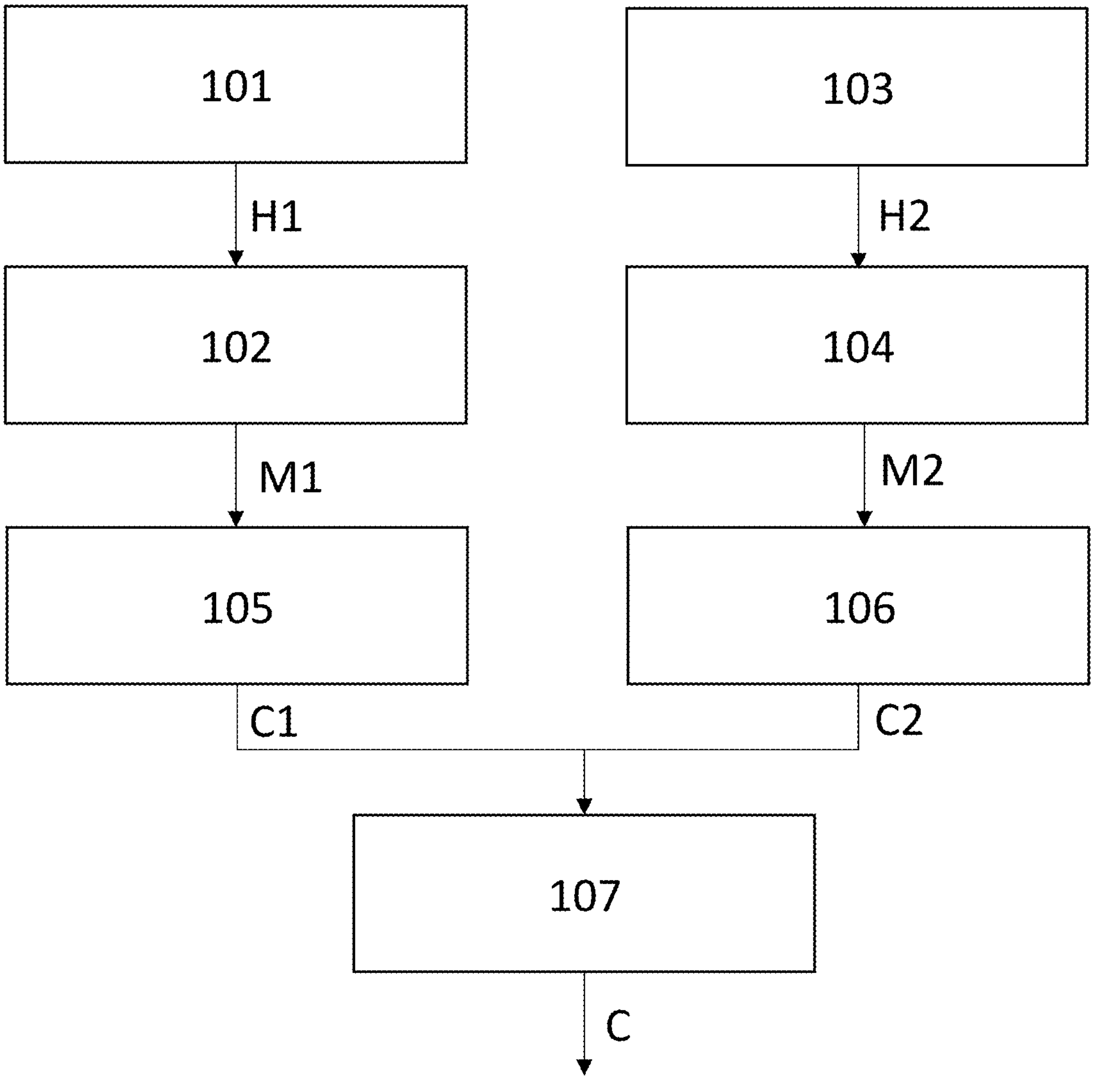
FIG. 5 is a flowchart representing the steps of the method of the invention according to one embodiment.
Figure 6:
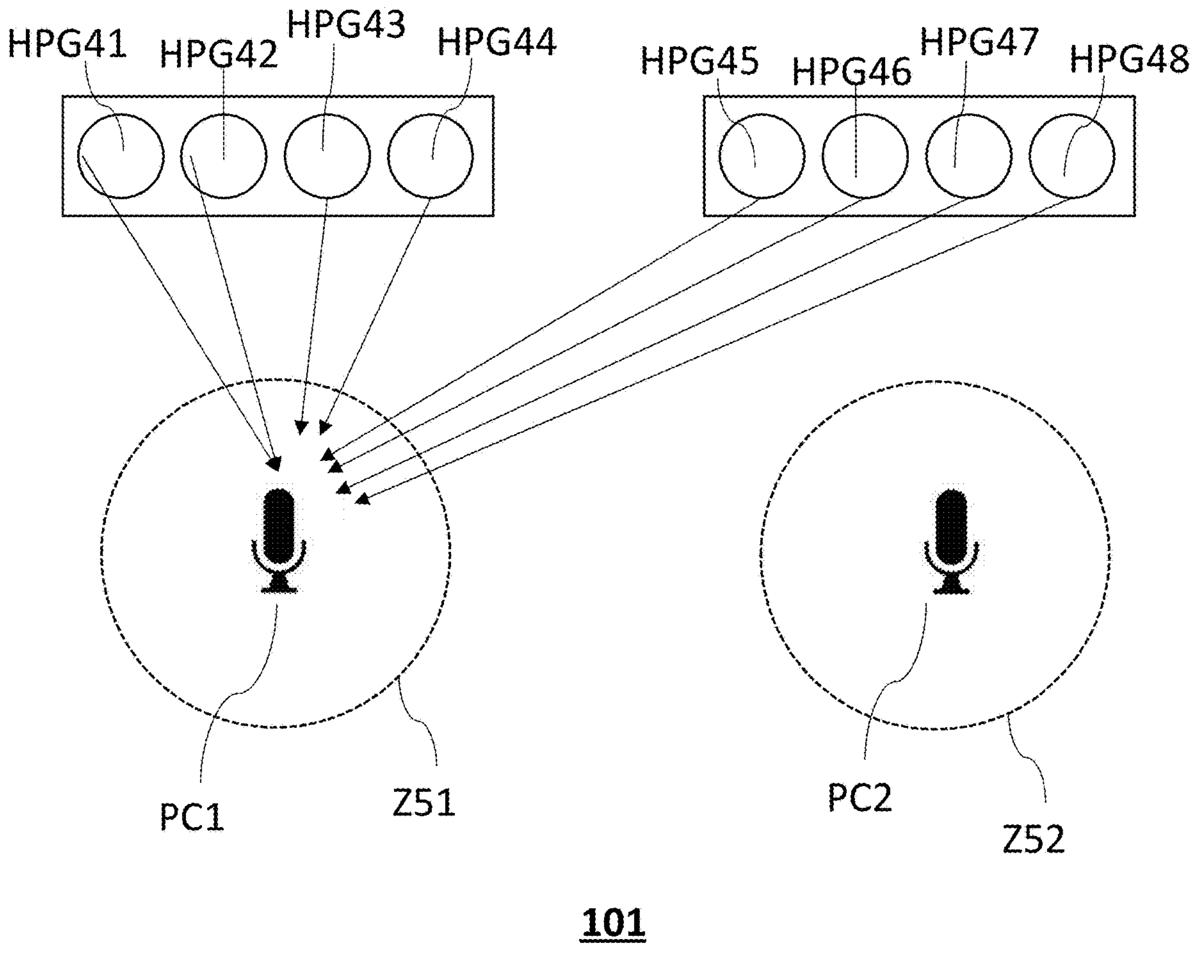
FIG. 6 is a schematic representation of the step of measuring and/or simulating a first propagation matrix between the different low-frequency loudspeakers and the different zones of the method of FIG. 5 according to an monophonic embodiment.

As illustrated in FIGS. 5 and 6, the first step of the method consists in measuring and/or simulating 101 a first propagation matrix H1 between the different low-frequency loudspeakers HPG41-HPG48 and the different zones Z41, Z42.

To do this, we measure or simulate the frequency response between control points PC1, PC2 and each low-frequency loudspeaker HPG21, HPG22.

As illustrated in FIG. 6, the measurement may be obtained by positioning a microphone in each zone Z51, Z52. The coordinates of the positions of the microphones correspond to the control points PC1, PC2. Once the control points PC1, PC2 are defined, the low-frequency loudspeakers HPG21, HPG22 are controlled to broadcast sound waves whose frequency varies over all or part of the frequency range as the low-frequency loudspeaker HPG21, HPG22 can produce. Typically, the low-frequency loudspeaker s HPG21, HPG22 may be controlled to broadcast a sliding sinusoidal signal over a frequency range comprised between 20 Hz and 40,000 Hz.

Alternatively, to simulate the frequency response of the low-frequency loudspeakers HPG21, HPG22, a model replicating the characteristics of the loudspeakers may be used. To do this, the pressure generated by the loudspeaker is assimilated to the pressure radiated by an acoustic monopole or a piston. Alternatively, the pressure radiated by the loudspeaker may also be calculated using a numerical model based on the Finite Element Method or the Boundary Element Method.

Each transfer function $H1_{M,N}$ between each control point PC1, PC2 and each low-frequency loudspeaker HPG21, HPG22 is indexed such that M is the number of the control point and N, the number of the loudspeaker.

Figure 7:
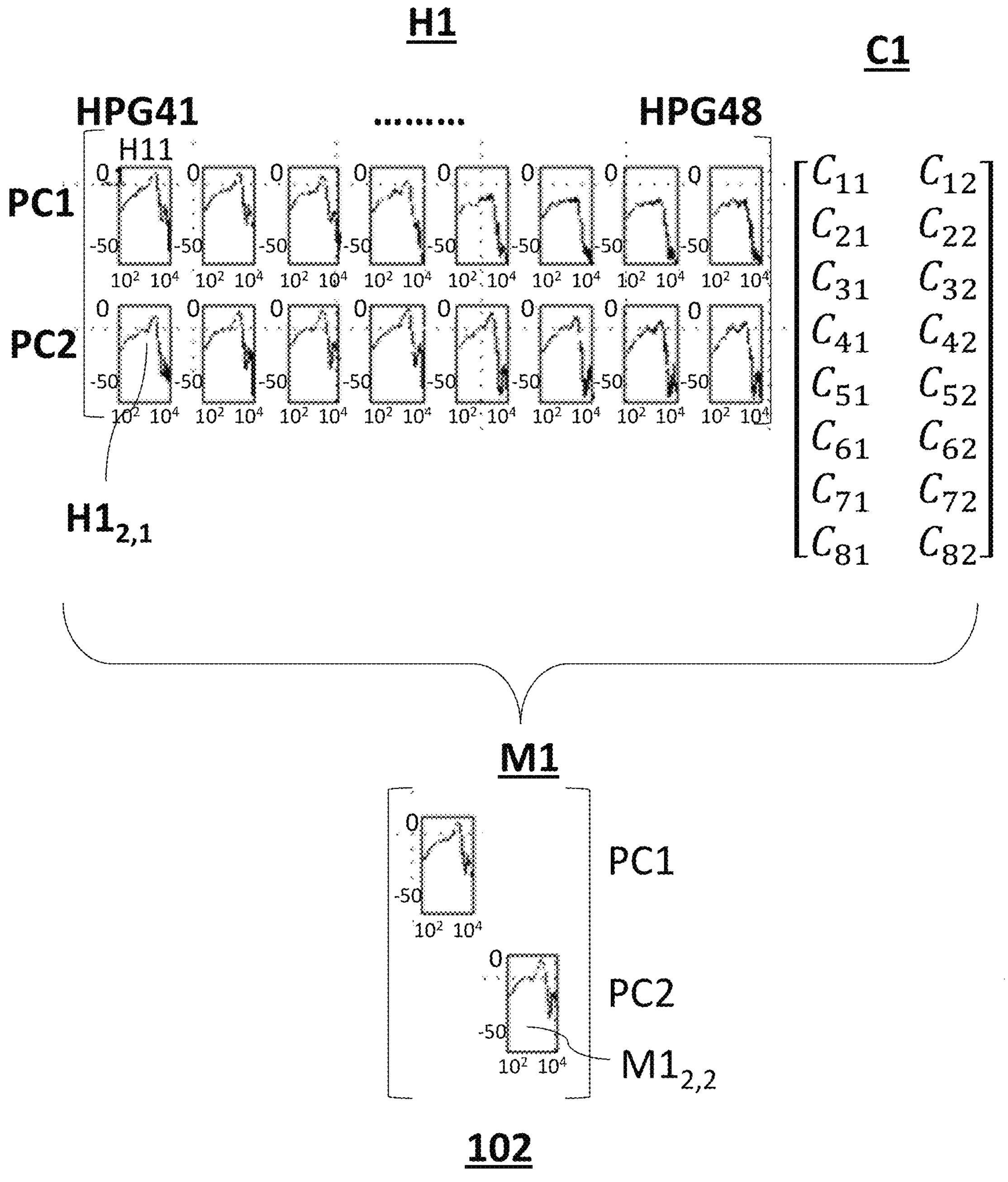
FIG. 7 is a schematic representation of obtaining the first objective matrix according to the embodiment of FIG. 6, as a function of the first propagation and filtering matrices.

Thus, the propagation matrix H1 illustrated in FIG. 7 is obtained. This propagation matrix H1 has 2 rows and 8 columns because two control points PC1, PC2 are present in space and 8 low-frequency loudspeakers HPG41-HPG48 are considered.

Figure 10:
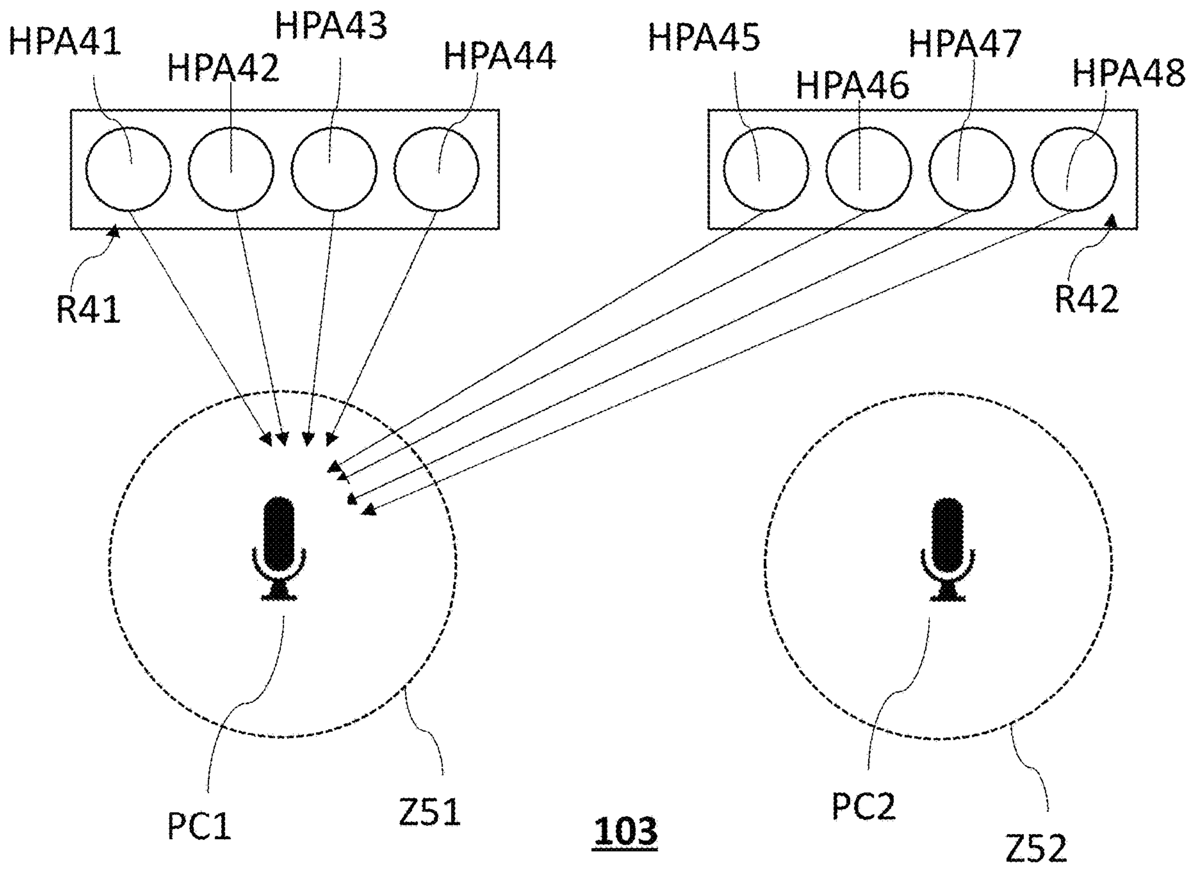
FIG. 10 is a schematic representation of the step of measuring and/or simulating a second propagation matrix between the different arrays of high-frequency loudspeakers and the different zones of the method of FIG. 5 according to a monophonic embodiment, FIG. 11 a schematic representation of the second objective matrix according to the embodiment of FIG. 8, as a function of the second propagation and filtering matrices.

The second step of the method, as illustrated in FIGS. 5 and 10, consists in measuring and/or simulating 103 a second propagation matrix H2 between the different arrays of high-frequency loudspeakers HPA41-HPG48 and the different zones Z51, Z52. A method similar to that illustrated in FIG. 6 may be used.

The arrays R41, R42 of high-frequency loudspeakers HPA41-HPA48 are then controlled to broadcast sound waves whose frequency varies over all or part of the frequency range that the high-frequency loudspeakers HPA41-HPA48 can produce. Typically, the arrays R41, R42 of high-frequency loudspeakers HPA41-HPA48 may be controlled to broadcast a sliding sinusoidal signal over the entire range of audible frequencies, i.e. between 20 Hz and 40 kHz.

Each transfer function $H2_{M,N}$ between each control point PC1, PC2 and each array R41, R42 of high-frequency loudspeakers HPA41-HPA48 is indexed such that M is the number of the control point and N, the number of the array R41, R42. Following the example of FIG. 10, we obtain the propagation matrix H2 illustrated in FIG. 11. This propagation matrix H2 has 2 rows and 2 columns because two control points PC1, PC2 are present in the space and 2 arrays R41, R42 of high-frequency loudspeakers HPA41-HPA48 each emitting a sound beam in the direction of the two control points PC1 and PC2 are considered.

The two steps 101, 103 are independent and carried out one after another.

Steps 102 and 104 consist in determining first and second objective matrices M1, M2 from the first and second propagation matrices H1, H2 by canceling the transfer functions in the zones intended to receive the destructive sound waves.

Thus, in step 102, it is sought to cancel the transfer functions H11,N between the low-frequency loudspeakers HPG41-HPG44 and the zone Z52 as well as the transfer functions H12,N between the low-frequency loudspeakers HPG45-HPG48 and the zone Z51.

In the case where it is desired to obtain a monophonic sound in the zones Z51 and Z52, the obtained matrix M1 is as illustrated in FIG. 7. Thus, the obtained matrix M1 is the product of the matrix H1 and the filtering matrix C1, the latter including 8 rows and 2 columns. Hence, the obtained matrix M1 has 2 rows and 2 columns and only the coefficients $M1_{1,1}$ and $M1_{2,2}$ are kept.

Figure 8:
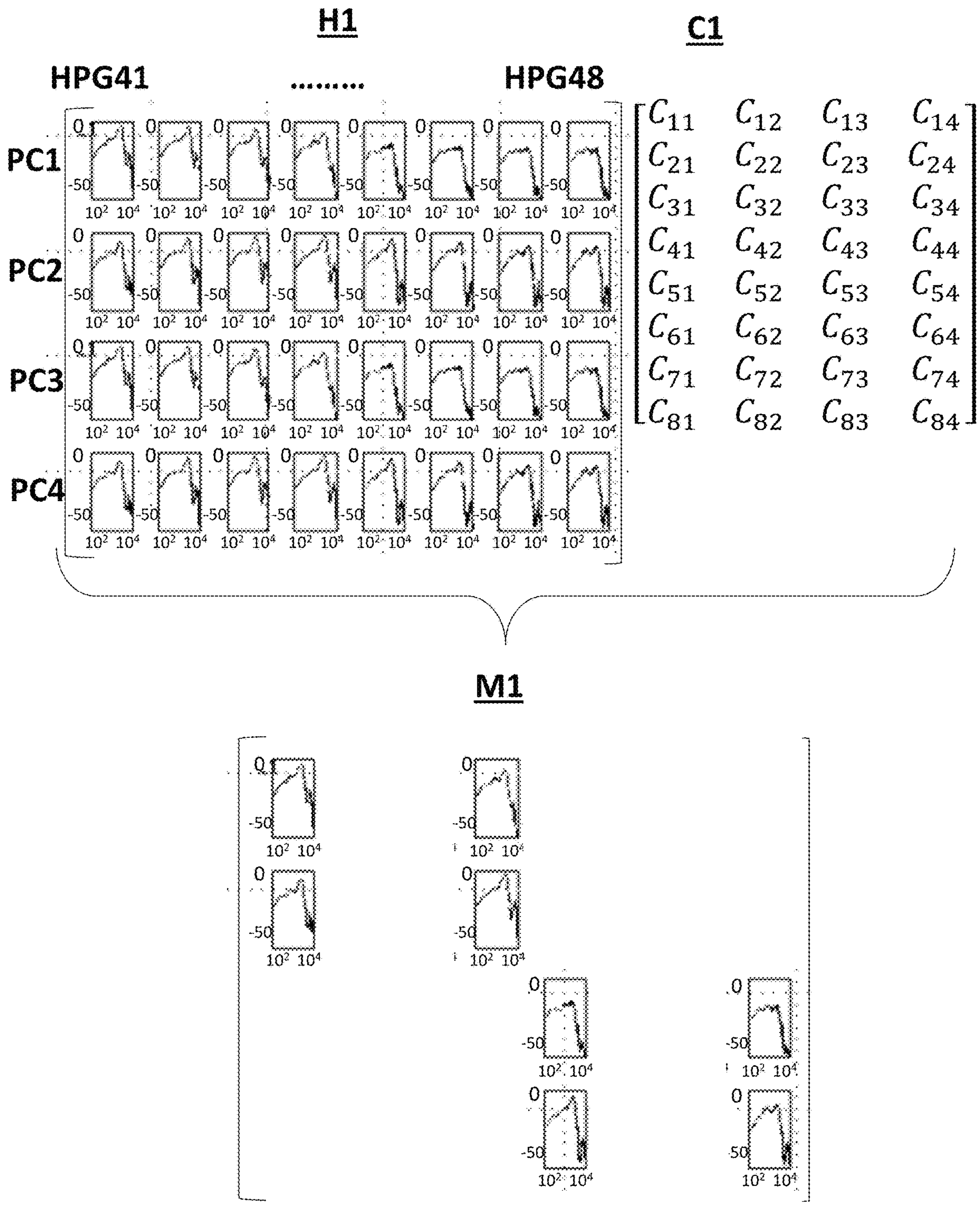
FIG. 8 is a schematic representation of obtaining the first objective matrix for a stereophonic sound rendering, as a function of the first propagation and filtering matrices.

In the case where it is desired to obtain stereophonic sound rendering, the propagation matrix H1 is established between 8 loudspeakers HPG41-HPG48 and 4 control points PC1-PC4. Hence, the matrix H1 has 4 rows and 8 columns, whereas the filtering matrix C1 has 8 rows and 4 columns. To obtain the matrix M1, it is necessary to keep 2 response per row and per column. Several solutions are possible and an example of conservation is illustrated in FIG. 8.

Figure 9:
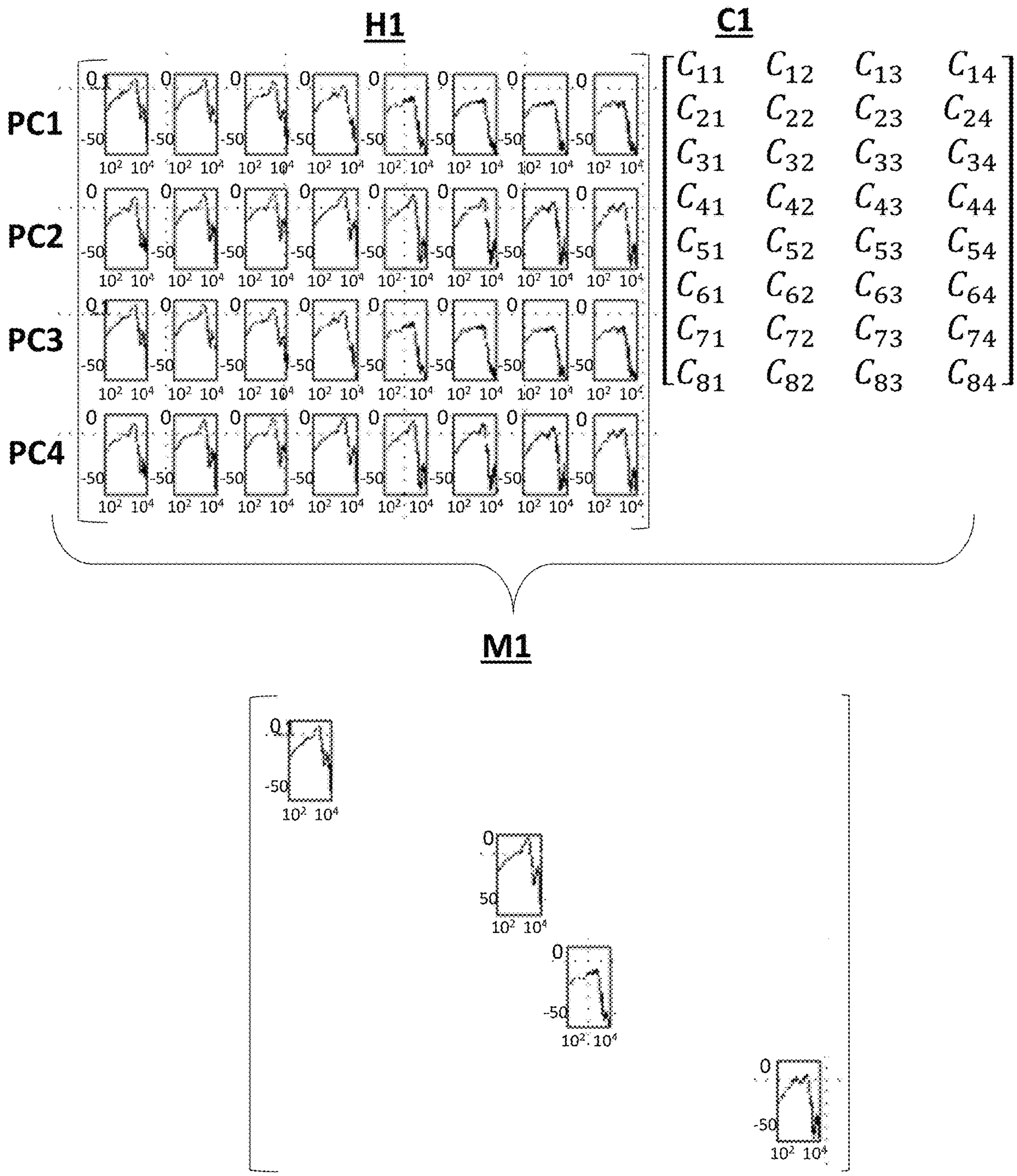
FIG. 9 is a schematic representation of obtaining the first objective matrix for a 3D sound rendering, as a function of the first propagation and filtering matrices.

In the case where it is desired to obtain a 3D sound rendering, the propagation matrix H1 is established between 8 loudspeakers HPG41-HPG48 and 4 control points PC1-PC4. Hence, the matrix H1 has 4 rows and 8 columns, whereas the filtering matrix C1 has 8 rows and 4 columns. To obtain the matrix M1, 1 response per row and per column should be kept. Several solutions are possible and an example of conservation is illustrated in FIG. 9.

Figure 11:
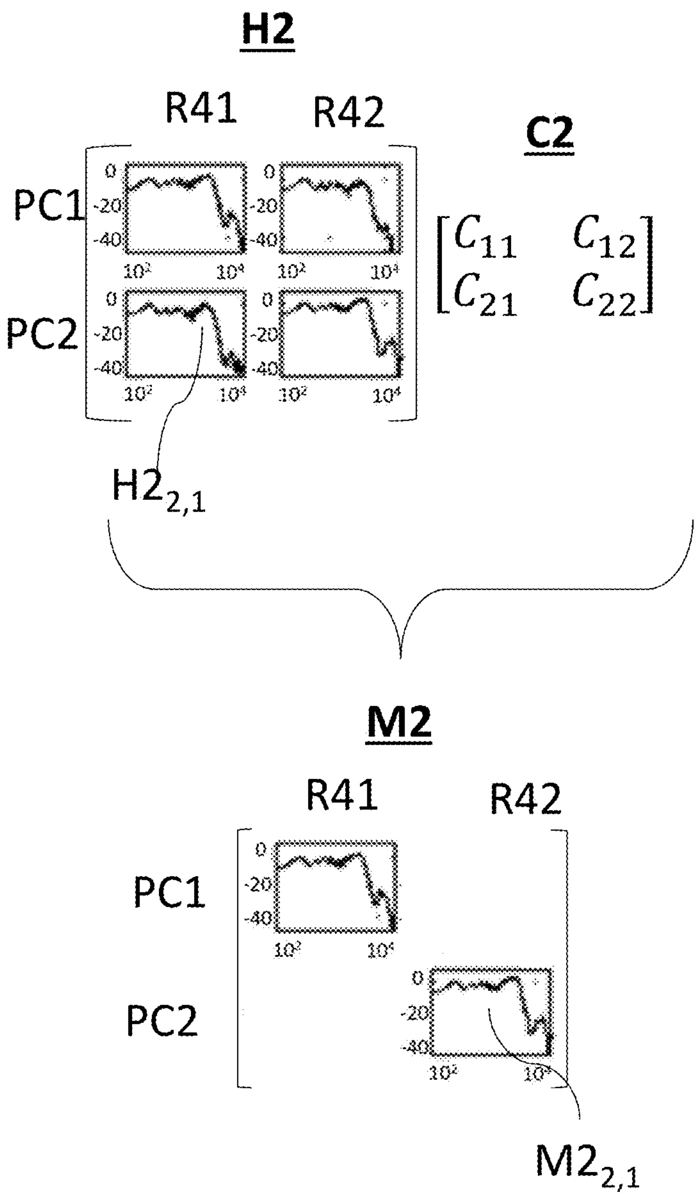

In the same manner, in step 104, it is sought to cancel the transfer functions $H2_{1,N}$ between the arrays of high-frequency loudspeakers HPA41-HPA44 and the zone Z52 as well as the transfer functions $H2_{2,N}$ between the arrays of high-frequency loudspeakers HPA45-HPA48 and the zone Z51. In the case where it is desired to obtain a monophonic sound, the obtained matrix M2 is illustrated in FIG. 11. The matrix M2 is the product of two square matrices H2, C2, so it is also square.

Figure 12:
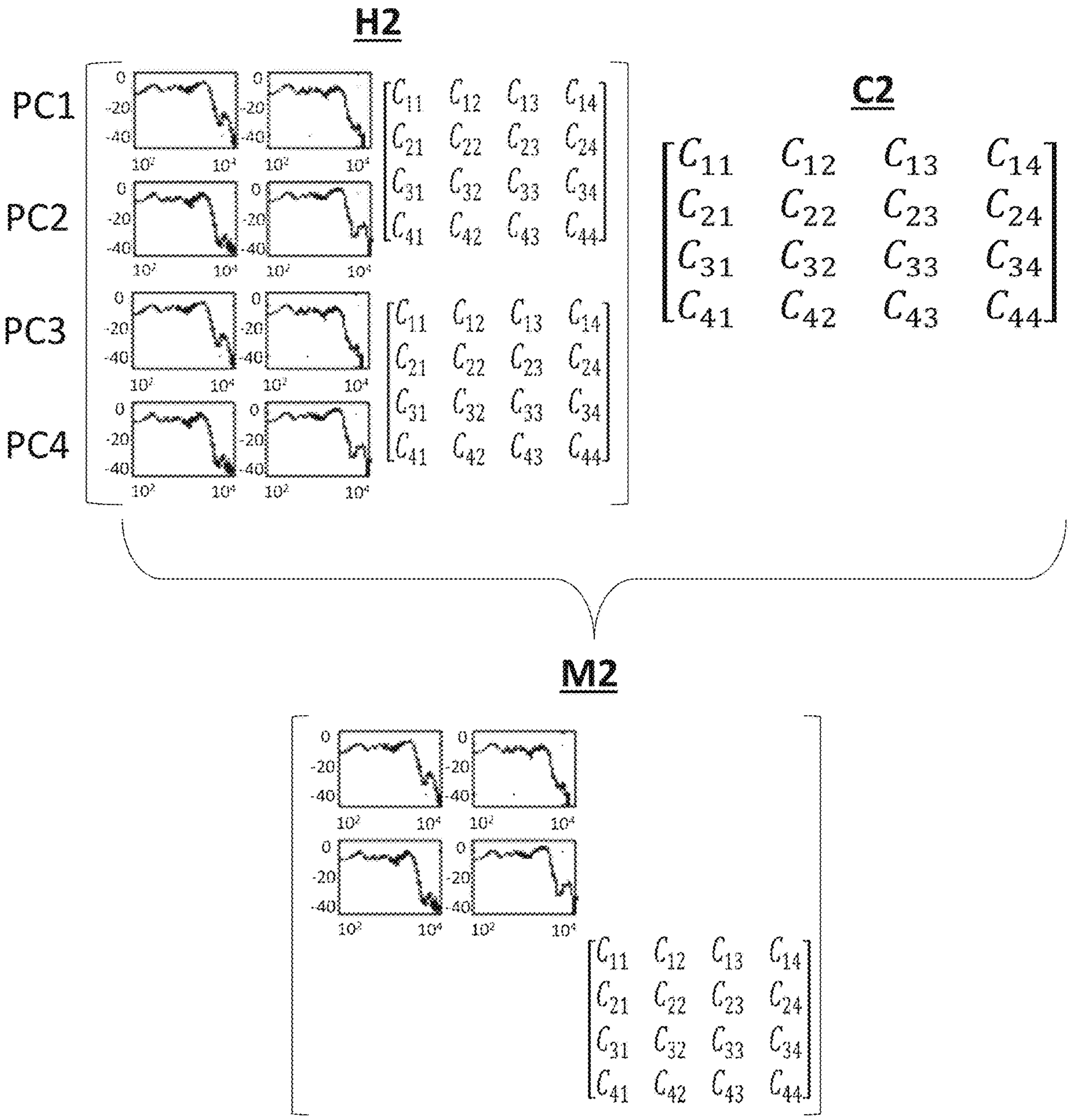
FIG. 12 is a schematic representation of obtaining the second objective matrix for a stereophonic sound reproduction, as a function of the second propagation matrix and the second filtering matrix.

In the case where it is desired to obtain a stereophonic sound rendering, 2 responses per line and per column should be kept. Several solutions are possible and an example of conservation is illustrated in FIG. 12. The matrix M2 is the product of two square matrices H2, C2, so it is also square.

Figure 13:
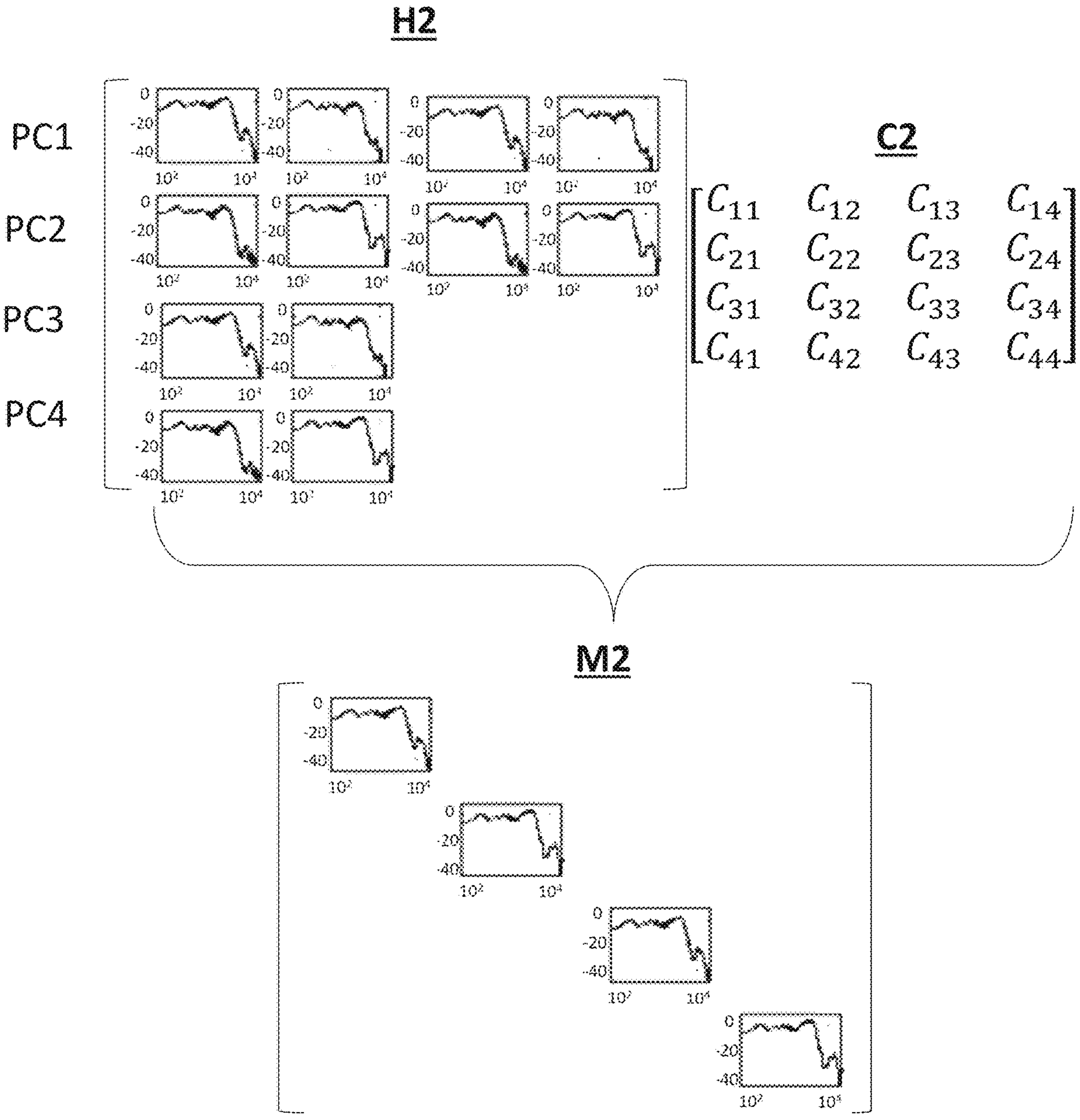
FIG. 13 is a schematic representation of obtaining the second objective matrix for a 3D sound rendering, as a function of the second propagation matrix and the second filtering matrix.

In the case where it is desired to obtain a 3D sound rendering, the matrix M2 is a diagonal matrix, as illustrated in FIG. 13. The matrix M2 is the product of two square matrices H2, C2, so it is also square.

Steps 105 and 106 consist in calculating first and second filtering matrices C1, C2 corresponding to the product of the inverse matrix of the propagation matrix H1, H2 and the objective matrix M1, M2, namely $C1=H2^{-1}.M2$ and $C2=H1^{-1}.M2$.

The filtering matrices C1, C2 are calculated so as to minimize the error between the matrix obtained after filtering and the objective matrix M1, M2. Furthermore, in the example of FIG. 7, the matrix H1 is not square. Only a pseudo-inversion of the matrix H1 can then be performed and the introduction of an error parameter β is necessary. By seeking to minimize the value of the parameter β, it is then possible to converge towards inversion solutions. The value of the parameter β may be constant or depend on the frequency. However, these solutions could have the effect of modifying the frequency response of the resulting sound waves, then resulting in sound coloring compared to the desired sound in the objective matrices M1 and M2. These solutions could also reduce the dynamic range of the system, i.e. the sound level range covered by the system.

Figure 14:
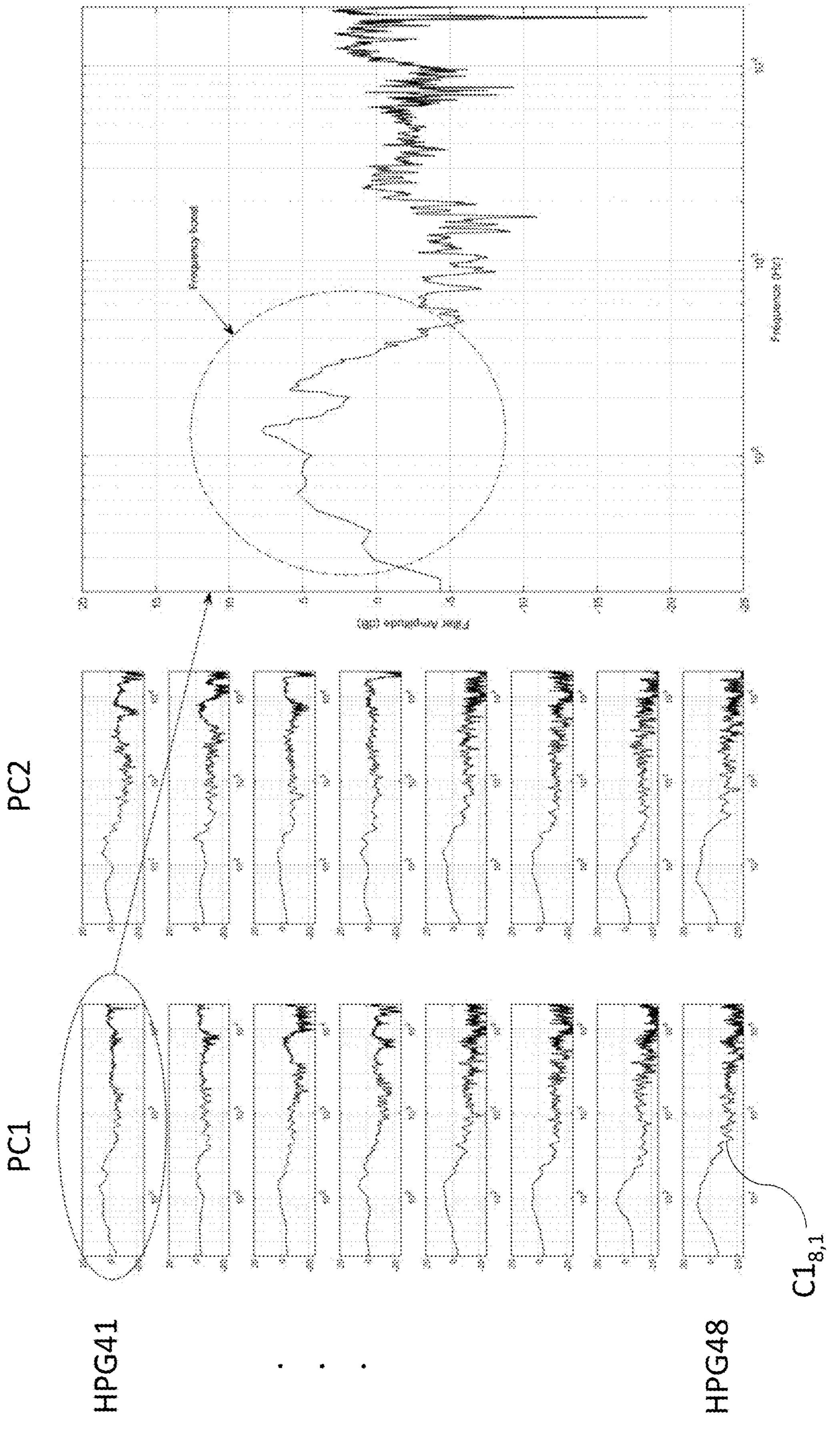
FIG. 14 is a schematic representation of the first filtering matrix according to the embodiment of FIG. 7.
Figure 15:
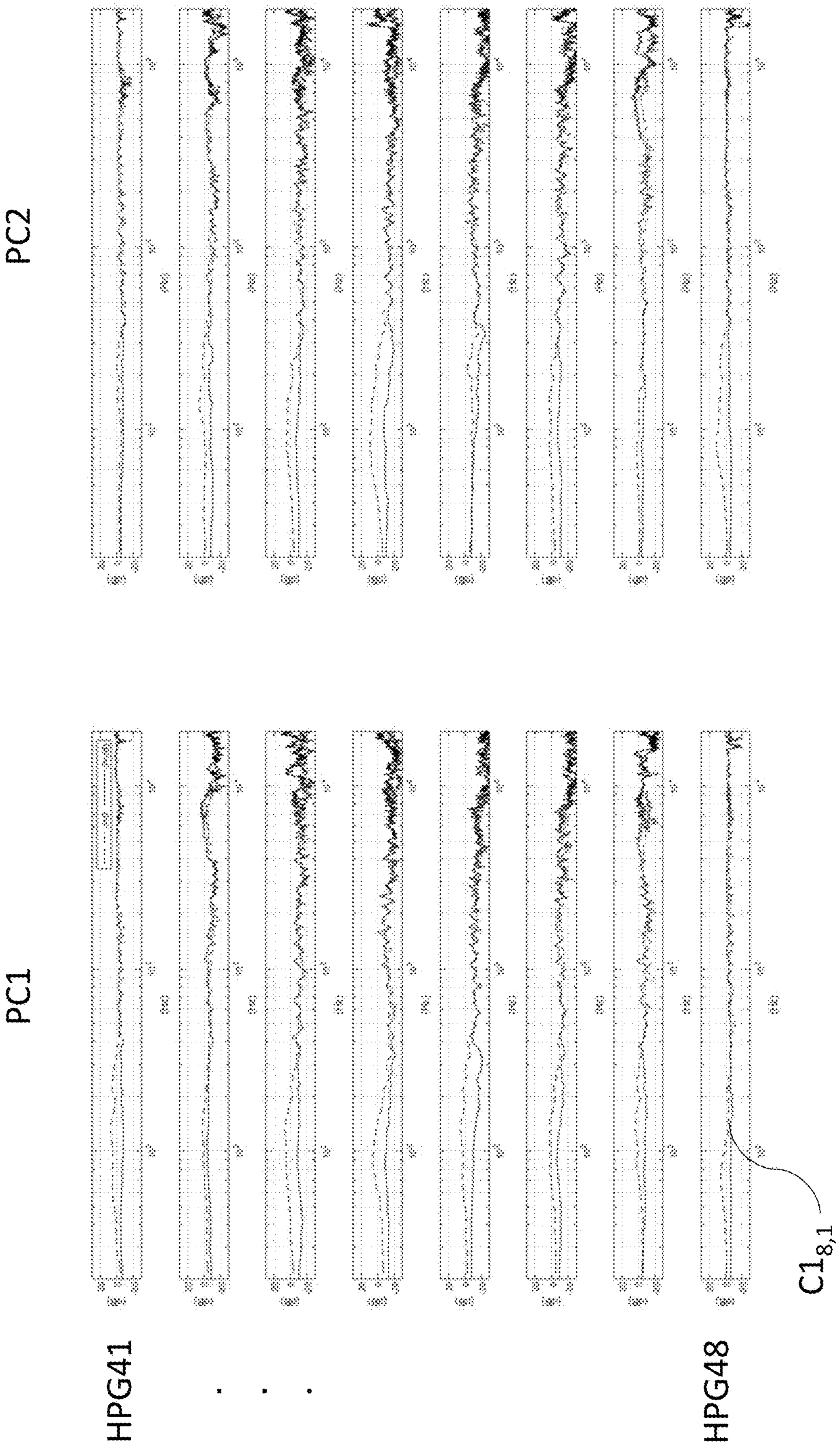
FIG. 15 is a schematic representation of the second filtering matrix after optimization of the parameter β, according to the embodiment of FIG. 7.

As an example, FIG. 14 illustrates the filtering matrix C1 obtained for the example of FIG. 9. This matrix has 8 rows and 2 columns. In addition, at low frequencies, typically between 10 Hz and 500 Hz, for each filter $C1_{N,M,}$ we observe a high gain of up to 8 dB. FIG. 15 illustrates the effect of the introduction of the parameter β on the gain. This parameter introduces errors with respect to the objective matrix M1, M2, but limits the effort. The value of β is optimized for each frequency. Thus, in FIG. 14, the dotted curve illustrates the filtering matrix C1 before regularization, i.e. with B=0, and the solid curve illustrates the filtering matrix C1 after regularization. We thus observe that the gain of the filters, particularly at low frequencies, is lower, i.e. close to 0 dB.

The method used to calculate the filtering matrix C2 is identical to the previously-described method.

Advantageously, it is possible to calculate, in step 107, a common filtering matrix C from the first and second filtering matrices C1, C2.

Figure 16:
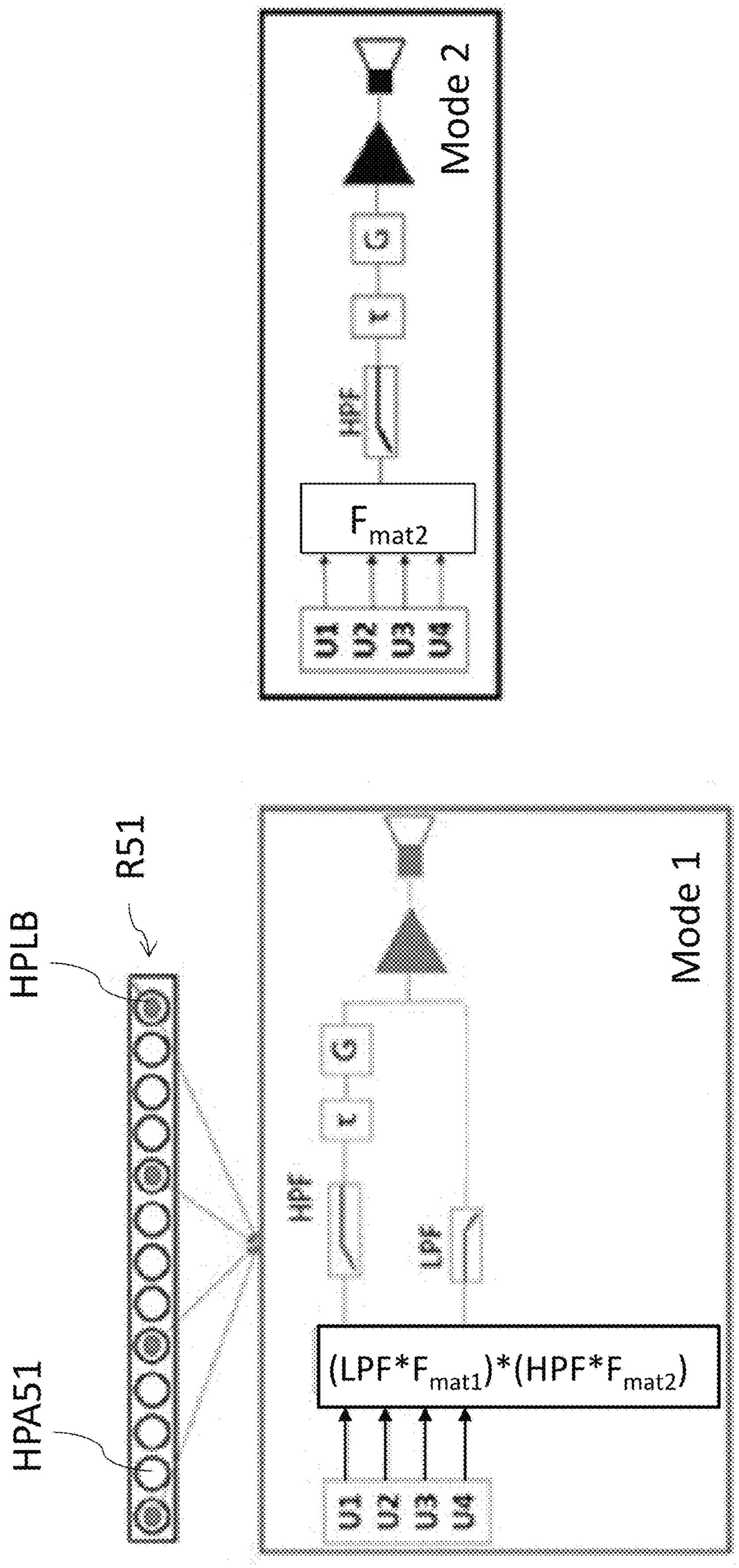
FIG. 16 is a schematic representation of the fusion of the filtering matrices according to two distinct embodiments.

To do this, according to an example illustrated in FIG. 16, an array R51 of 13 loudspeakers, including 9 high-frequency loudspeakers HPA51 and 4 broadband loudspeakers HPLB may be used. Alternatively, the array R51 may include only broadband loudspeakers HPLB. The array R51 illustrated in FIG. 16 is controlled by several filters configured to transmit to the broadband loudspeakers HPLB the bass part of the sound and to transmit to the high-frequency loudspeakers HPA51, the treble part of the sound.

Within this array R51, the high-frequency loudspeakers HPA51 and the broadband loudspeakers HPLB are grouped into sub-arrays in order to calculate corresponding filter matrices. In other words, for the sub-array of high-frequency loudspeakers HPA51, a first filtering matrix is calculated and for the sub-array of broadband loudspeakers HPLB1, a second filtering matrix is calculated.

To merge these filtering matrices, there are two possibilities.

The first solution Mode 1 consists in using thresholding. For example, thresholding may be carried out on the cutoff frequency. For example, the value of the thresholding frequency may be identical to the cutoff frequency selected for the low-pass and/or high-pass filters allowing distinguishing high frequencies from low frequencies.

Thus, if the frequency commanded to the array R51 is lower than the thresholding frequency then it is the coefficient of the first filtering matrix which is selected. Conversely, if the frequency commanded to the array R51 is high than the thresholding frequency then it is the coefficient of the second filtering matrix which is selected.

Alternatively, the second solution Mode 2 consists in multiplying the two filtering matrices by adding a low-pass filter LPF on the first filtering matrix and a high-pass filter HPF on the second filtering matrix.

With either one of the previously-described methods, the filtering matrices C, C1, C2 of the filters could be determined during installation of the system. Furthermore, one or more matri(x/ces) could be recalculated over time or several sets of filtering matrices C, C1, C2 could be predetermined and used as needed.

For example, it is possible to add a user's head tracking functionality to the system. An embodiment is described in the document U.S. Pat. No. 6,243,476. From the position of the head, it is possible to calculate or use a specific filtering matrix C, C1, C2.

The invention allows generating sound waves for at least two distinct zones of the same space with satisfactory sound quality and robustness to movements, while limiting the bulk of the system, i.e. the number of loudspeakers and the complexity of the control electronics.

In order to compare the performances of the system of the invention with existing systems, several simulations have been carried out.

Figure 17:
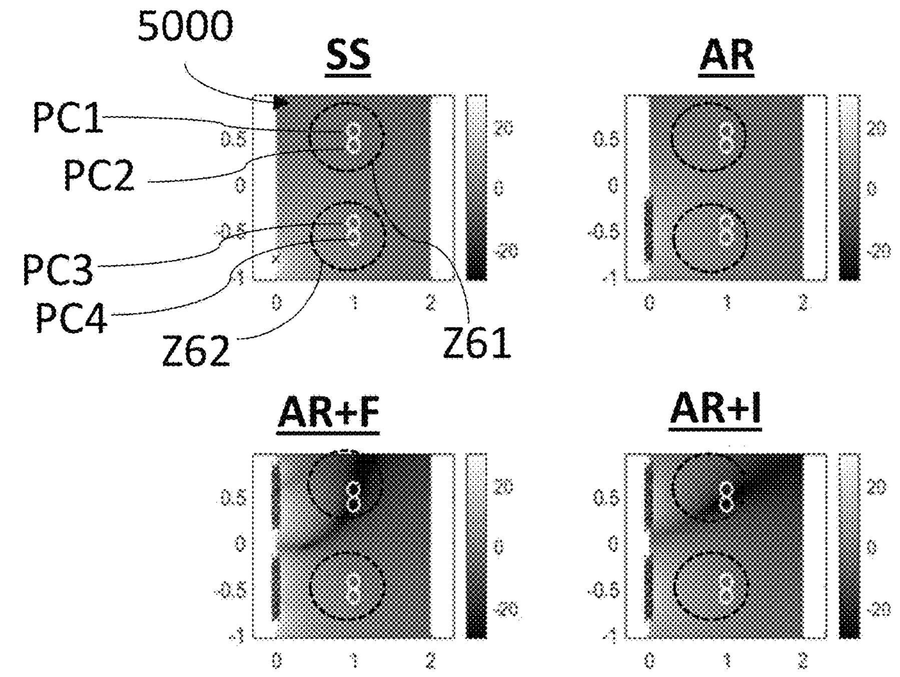
FIG. 17 is a comparative graph of the spatial distribution of the sound intensity for one single source, an array with prior filtering on each source, a directional array and an array of loudspeakers with prior filtering on each beam for a frequency of 100 Hz.

To do this, we define two zones Z61 and Z62 of a space 5000. Within each zone Z61, Z62, two control points PC1-PC4 are positioned. Afterwards we control one single source SS, an array of loudspeakers AR, an array of loudspeakers with individual filtering of each loudspeaker AR+F and the system of the invention AR+I to broadcast a sound wave at a frequency of 100 Hz, as shown in FIG. 17.

We observe that, in the case of one single source SS at low frequencies, the zones Z61, Z62 receive a substantially homogeneous sound intensity comprised between −5 and 5 dB. The directionality is very low and the zones Z61, Z62 are not differentiated.

In the case of an array of loudspeakers AR, the zones Z61, Z62 receive a sound intensity similar to the single source SS, between −5 and 5 dB. The directionality is very low and the zones Z61, Z62 are not differentiated.

In the case of an array of loudspeakers with individual filtering of each loudspeaker AR+F, we observe that the zone Z61 has a sound level close to −30 dB, whereas the zone Z62 has a sound level comprised between 0 and 5 dB. Hence, there is therefore a differentiation in the sound level between the zones Z61, Z62.

In the case of the system of the invention AR+I, we observe that the zone Z61 also has a sound level between −20 dB and −30 dB, whereas the zone Z62 has a sound level comprised between 0 and 5 dB. Hence, there is a differentiation in the sound level between the zones Z61, Z62. At 100 Hz, the results between the invention AR+I and an array of loudspeakers with individual filtering of each loudspeaker AR+F are comparable.

Figure 18:
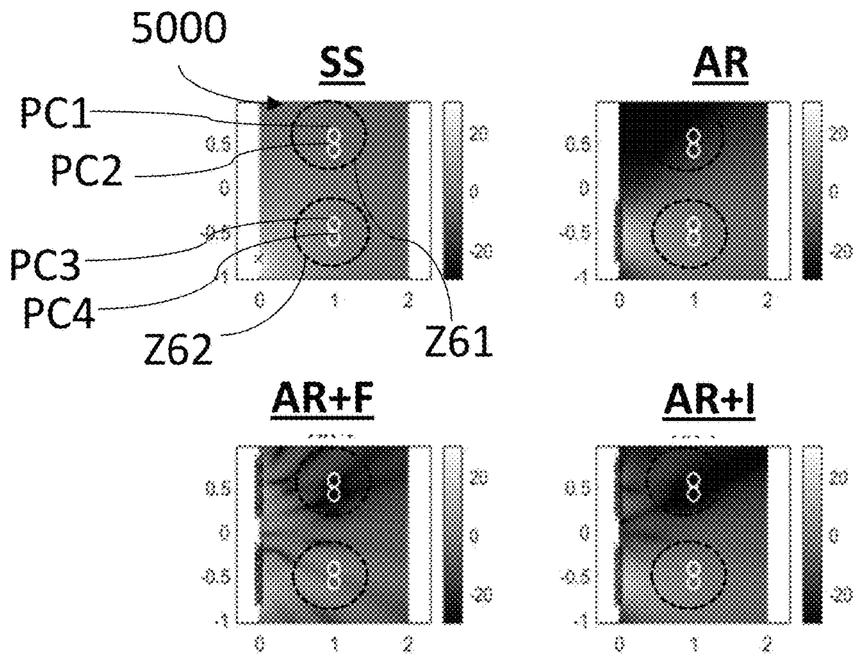
FIG. 18 is a comparative graph of the spatial distribution of the sound intensity for one single source, an array with prior filtering on each source, a directional array and an array of loudspeakers with prior filtering on each beam for a frequency of 1,000 Hz.

FIG. 18 illustrates the same elements controlled to broadcast a sound wave at a frequency of 1,000 Hz.

We observe that, in the case of one single source SS, the zones Z61, Z62 receive a substantially homogeneous sound intensity comprised between −5 and 5 dB. The directionality is very low and the zones Z61, Z62 are not differentiated.

In the case of an array of loudspeakers AR, we observe that the zone Z61 has a sound level between −10 dB and −20 dB, whereas the zone Z62 has a sound level comprised between 0 and 5 dB. Hence, there is therefore a differentiation in the sound level between the zones Z61, Z62.

In the case of an array of loudspeakers with individual filtering of each loudspeaker AR+F, we observe that the zone Z61 has a sound level comprised between −30 dB and −15 dB, whereas the zone Z62 has a sound level comprised between −5 and 5 dB. Hence, there is a differentiation in the sound level between the zones Z61, Z62. However, we observe that the zones Z61 and Z62 include intensity lines. In other words, the sound intensity can vary abruptly, typically from −5 dB to 5 dB within a zone Z62 when passing from one line to another. Thus, this system allows for a very good sound insulation since each of the control points PC1-PC4 is positioned in a different line, but this system is not robust enough if the user moves within the zones Z61, Z62 relative to the control points PC1-PC4.

In the case of the system of the invention AR+I, we observe that the zone Z61 has a sound level close to −30 dB, whereas the zone Z62 has a sound level comprised between 0 and 5 dB. Hence, there is a differentiation in the sound level between the zones Z61, Z62. Furthermore, the sound intensity is substantially homogeneous over the entire surface of the zone Z61, Z62, which allows obtaining a good robustness with regards to the movements of the user within the zones Z61, Z62 relative to the control points of control PC1-PC4.

Figure 19:
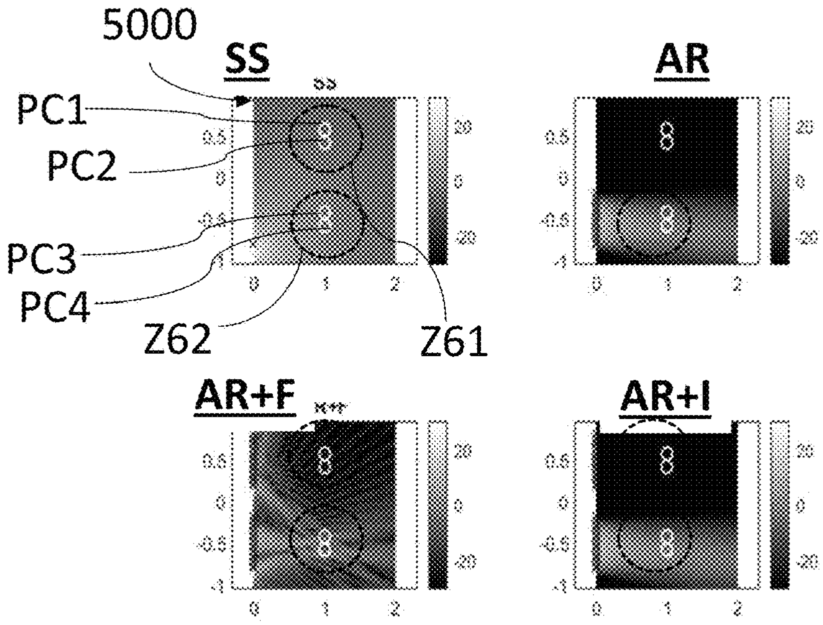
FIG. 19 is a comparative graph of the spatial distribution of the sound intensity for one single source, an array with prior filtering on each source, a directional array and an array of loudspeakers with prior filtering on each beam for a frequency of 2,000 Hz.

As illustrated in FIG. 19, the same elements are controlled to broadcast a sound wave at a frequency of 5,000 Hz.

We observe that, in the case of one single source SS at high frequencies, the zones Z61, Z62 receive a substantially homogeneous sound intensity comprised between −5 and 0 dB. The directionality is very low and the zones Z61, Z62 are not differentiated.

In the case of an array of loudspeakers AR, we observe that the zone Z61 has a homogeneous sound level of −30 dB, whereas the zone Z62 has a sound level comprised between 0 and 5 dB. Hence, there is therefore a differentiation in the sound level between the zones Z61, Z62.

In the case of an array of loudspeakers with individual filtering of each loudspeaker AR+F, we observe that the zone Z61 has a sound level comprised between −30 dB and −20 dB, whereas the zone Z62 has a sound level comprised between −30 and 5 dB. Hence, there is a differentiation in the sound level between the zones Z61, Z62. However, we observe that the zones Z61 and Z62 also include intensity lines. Thus, the sound intensity can vary abruptly within the zones Z61 and Z62 when passing from one line to another. For example, within the zone Z62, if the users move within the zones Z61, Z62 relative to the control points PC1-PC4, the sound intensity they receive can abruptly pass from 0 dB to −30 dB. Thus, this system allows for a very good sound insulation since each of the control points PC1-PC4 is positioned on a different line, but this system is not robust enough if the users move within the zones Z61, Z62 relative to the control points PC1-PC4.

In the case of the system of the invention AR+I, we observe that the zone Z61 has a homogeneous sound level of −30 dB, whereas the zone Z62 has a sound level comprised between 0 and 5 dB. Hence, there is a differentiation in the sound level between the zones Z61, Z62. Furthermore, the sound intensity is substantially homogeneous over the entire surface of each zone Z61, Z62, which allows obtaining a better robustness with regards to the movements of the user.

Figure 20:
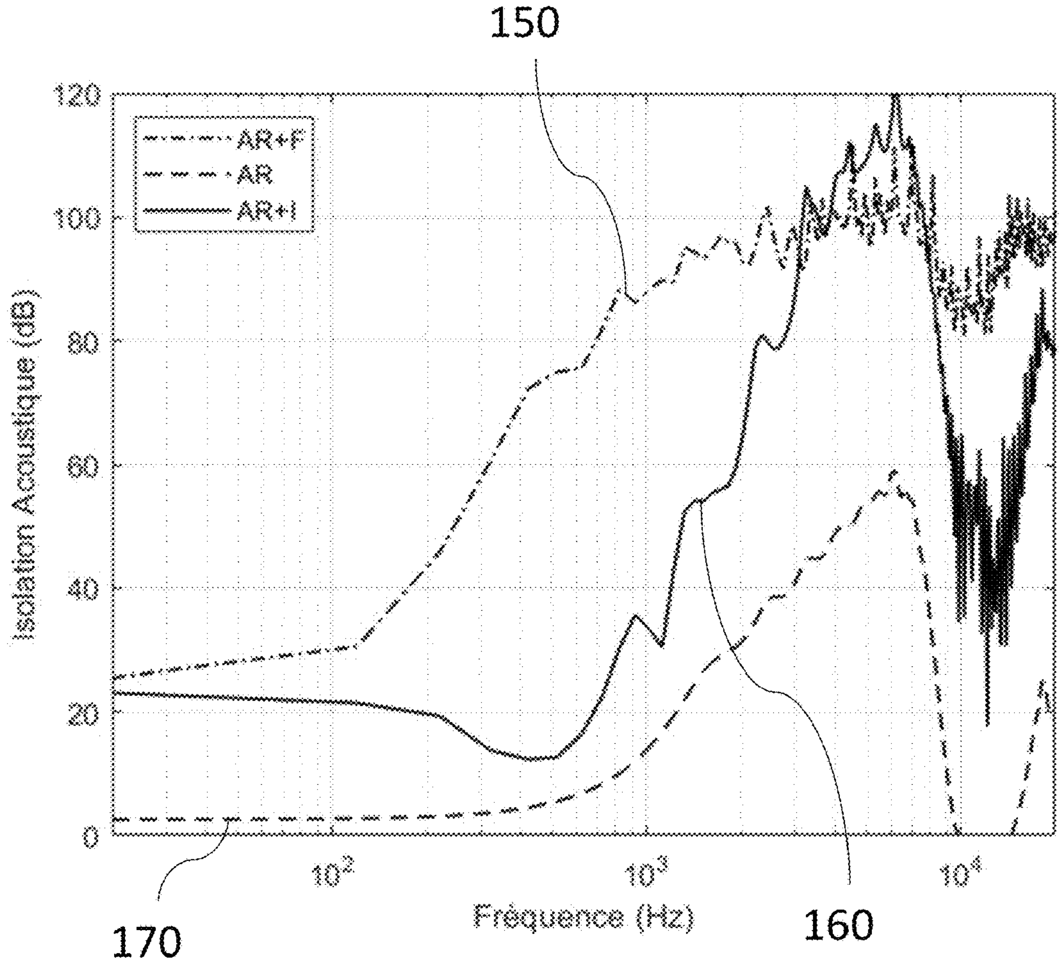
FIG. 20 is a comparative graph of the acoustic attenuation between two users as a function of frequency for an array of loudspeakers alone, an array with prior filtering on each source and an array with shared filtering.

According to another example, illustrated in FIG. 20, the invention allows obtaining a good insulation in the zones, while preserving a sufficient sound intensity. Thus, in FIG. 20, the curve 170 represents the level of acoustic insulation simulated between two control points PC1 and PC2 located in a first zone, and the control points PC3 and PC4 located in a second zone for one single array of loudspeakers AR. The acoustic insulation level NIA can be calculated from the difference in acoustic energy between the two zones, such that:

$$NIA = \text{mean}\left(\frac{|P_1 + P_2|^2}{|P_3 + P_4|^2}, \frac{|P_1|^2 + |P_2|^2}{|P_3|^2 + |P_4|^2}\right) \quad \text{[Math7]}$$

The acoustic insulation NIA is almost zero at low frequency because the array is not directional. The acoustic insulation NIA is greatest between 1 kHz and 9 kHz with a maximum level of 60 dB at 6 kHz. The insulation level NIA drops after 9 kHz, due to the presence of secondary lobes in the directionality of the array. These secondary lobes are directed towards the zone Z61, Z62 where it is sought to limit the sound intensity as much as possible, which tends to reduce the insulation of the zone Z61, Z62.

The curve 150 represents the evolution of the acoustic insulation NIA as a function of frequency for an array of loudspeakers processed individually. The acoustic insulation NIA is constant at around 30 dB between 0 and 100 Hz, then an intensity plateau is observed between 1000 Hz and 20 kHz. For this plateau, the sound intensity is comprised between 80 and 110 dB at the position for which the filters have been optimized. With an individual processing on each loudspeaker, it is therefore possible to achieve a significant acoustic insulation, but with low robustness against high-frequency head movements.

The curve 160 represents the evolution of the acoustic insulation NIA as a function of frequency for a system according to the invention. The acoustic insulation NIA is substantially constant between 20 and 30 dB for frequencies comprised between 0 and 100 Hz. An intensity peak is located between 1 kHz and 10 kHz. For this peak, the sound insulation reaches a theoretical maximum of 120 dB. We also observe that the insulation level drops at high frequency, i.e. around 8,000 Hz, mainly because of the apparition of secondary lobes oriented towards the zone in which we wish to minimize the sound intensity. However, with the invention, it is possible to increase the number of loudspeakers constituting the array, while maintaining the total length of the array with a minimum of structural changes to the system since the number of filters remains unchanged. Hence, the solution of the invention allows for more flexibility and robustness while making it possible to combine good sound intensity and good insulation.

Figure 21:
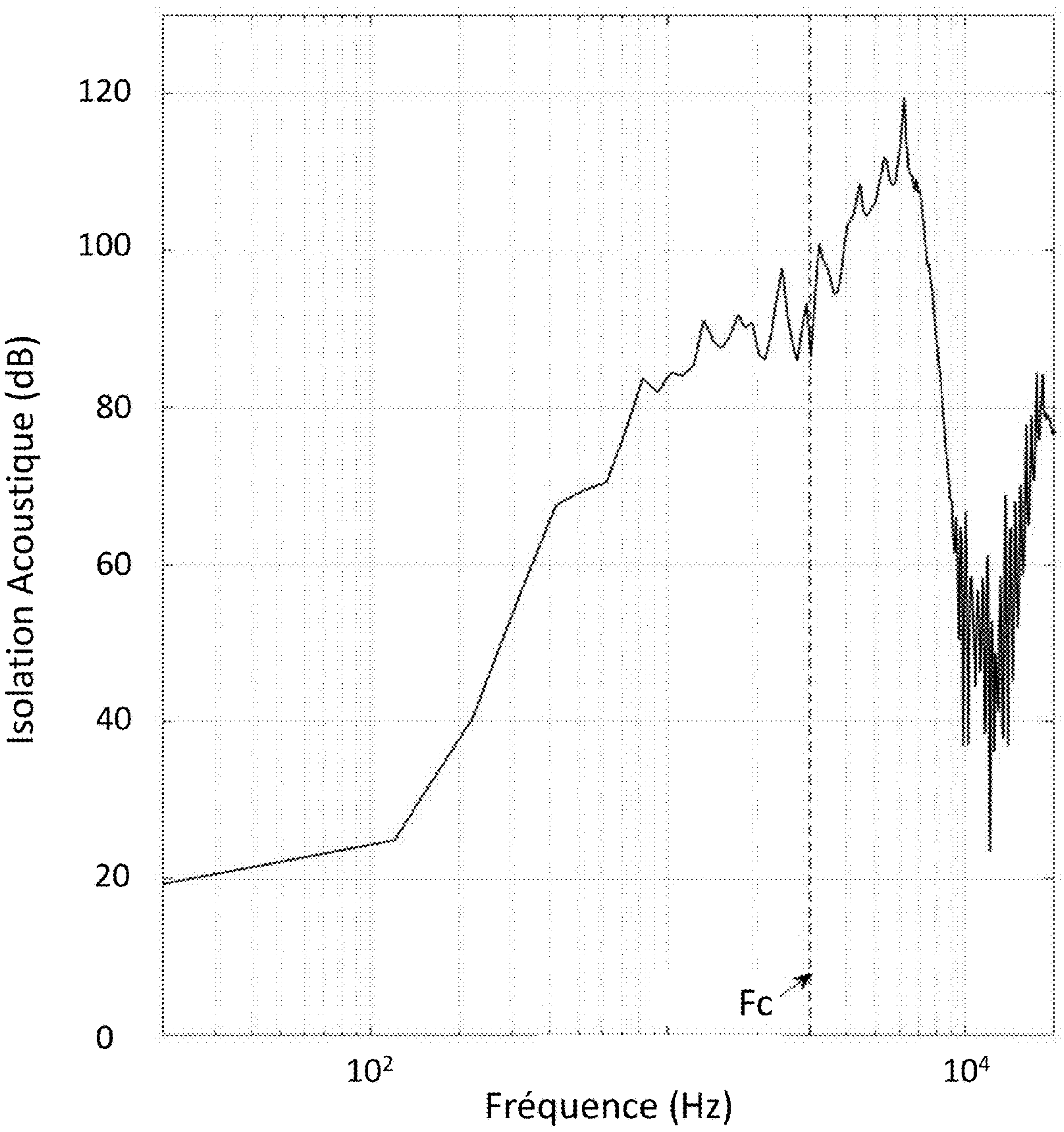
FIG. 21 is a graph of the acoustic attenuation obtained as a function of the frequency when a prior filtering is applied to each source of an array of 16 broadband loudspeakers per zone for a frequency lower than the cutoff frequency and when the invention is applied for frequencies higher than the cutoff frequency.

In an embodiment illustrated in FIG. 21, it is possible to favor either one of the sound reinforcement methods depending on the frequency, or to combine several methods. Thus, for example, for a array of broadband loudspeakers, it is possible to carry out individual filtering AR+F of each loudspeaker constituting the array or to carry out individual filtering only on some loudspeakers constituting the array when the frequency is lower than the cutoff frequency Fc of the system because this filtering produces the best sound results. When the frequency is higher than the cutoff frequency Fc, the system of the invention AR+I is used because it produces better results in terms of robustness against head movements for high frequencies. In this example, the cutoff frequency Fc is comprised between 1,000 and 10,000 Hz, and is for example equal to 3,000 Hz.

The invention claimed is:

1. A system for generating sound waves for at least two distinct zones of a same space, including a first zone for which a sound content corresponding to a first signal is expected and a second zone for which a sound content corresponding to a second signal is expected; said system including:

at least two arrays of high-frequency loudspeakers each including at least three high-frequency loudspeakers; and at least two low-frequency loudspeakers;

said system also including means for audio processing for the first signal and the second signal;

said audio processing means including:

two low-pass filters respectively configured to supply a low-frequency part of the first signal and a low-frequency part of the second signal;

two high-pass filters respectively configured to supply a high-frequency part of the first signal and a high-frequency part of the second signal;

a first matrix of filters configured to filter respectively the low-frequency part of the first signal and the low-frequency part of the second signal, and outputting a signal emitted by the first low-frequency loudspeaker, said signal including two components, a first component of the signal emitted by the first low-frequency loudspeaker corresponding to the first signal and a second component of the signal emitted by the first low-frequency loudspeaker corresponding to the second signal;

a second matrix of filters configured to filter respectively the low-frequency part of the first signal and the low-frequency part of the second signal, and outputting a signal emitted by the second low-frequency loudspeaker, said signal including two components, a first component of the signal emitted by the second low-frequency loudspeaker corresponding to the first signal and a second component of the signal emitted by the second low-frequency loudspeaker corresponding to the second signal;

a third matrix of filters configured to filter respectively the high-frequency part of the first signal and the high-frequency part of the second signal, and outputting a signal emitted by the first high-frequency loudspeaker array, said signal including two components, a first component of the signal emitted by the first high-frequency loudspeaker array corresponding to the first signal and a second component of the signal emitted by the first high-frequency loudspeaker array corresponding to the second signal; and a fourth matrix of filters configured to filter respectively the high-frequency part of the first signal and the high-frequency part of the second signal, and outputting a signal emitted by the second high-frequency loudspeaker array, said signal including two components, a first component of the signal emitted by the second high-frequency loudspeaker array corresponding to the first signal and a second component of the signal emitted by the second high-frequency loudspeaker array corresponding to the second signal;

said filter matrices being configured so that:

the audio content corresponding to the second signal component emitted by the first low-frequency loudspeaker and propagated by the first low-frequency loudspeaker in the first zone interferes destructively with the audio content corresponding to the second signal component emitted by the second low-frequency loudspeaker and propagated by the second low-frequency loudspeaker in the first zone;

the audio content corresponding to the first signal component emitted by the second low-frequency loudspeaker propagated by the second low-frequency loudspeaker in the second zone interferes destructively with the audio content corresponding to the first signal component emitted by the first low-frequency loudspeaker propagated by the first low-frequency loudspeaker in the second zone;

the audio content corresponding to the second signal component emitted by the first high-frequency loudspeaker array propagated by the first high-frequency loudspeaker array in the first zone interferes destructively with the audio content corresponding to the second signal component emitted by the second high-frequency loudspeaker array propagated by the second high-frequency loudspeaker array in the first zone;

the audio content corresponding to the first signal component emitted by the second high-frequency loudspeaker array propagated by the second high-frequency loudspeaker array in the second zone interferes destructively with the audio content corresponding to the first signal component emitted by the first high-frequency loudspeaker array propagated by the first high-frequency loudspeaker array in the second zone; and each sound content of each zone resulting from the sum of the sound waves propagated in said zone, each sound content being obtained by estimating the transfer functions between, on the one hand, the various bass loudspeakers and the various high-frequency loudspeaker arrays and, on the other hand, the two zones.

2. System according to claim 1, wherein several zones of said space are sounded by the same array of high-frequency loudspeakers forming at least two directive sound waves.

3. System according to claim 1 wherein the space including at least four zones, the system comprises at least four directional sound waves and at least four bass loudspeakers.

4. System according to claim 1 wherein the system comprises at least one broadband loudspeaker constituting both a low-frequency loudspeaker and a high-frequency loudspeaker of an array, said broadband loudspeaker receiving at least one high-frequency signal and at least one low-frequency signal.

5. System according to claim 1 wherein the system comprises, for each zone of said space, between two and six bass loudspeakers and an array including between ten and twenty high-frequency loudspeakers.

6. System according to claim 1 wherein the system further comprises means for detecting the position of the user's head, the audio processing means controlling the filters according to the position of the user's head.

7. Method for determining the filters of the system according to claim 1, said method including the following steps:

measurement and/or simulation of a first propagation matrix between the individual low-frequency loudspeakers and the individual zones;

measurement and/or simulation of a second propagation matrix between the arrays of high-frequency loudspeakers and the various zones, each propagation matrix including the transfer functions between each low-frequency loudspeaker or array of the high-frequency loudspeakers and each zone;

determination of a first objective matrix from the first propagation matrix by cancelling the transfer functions in the zones for which:

the audio content corresponding to the second component of the signal emitted by the first low-frequency loudspeaker propagated by the first low-frequency loudspeaker in the first zone interferes destructively with the audio content corresponding to the second component of the signal emitted by the second low-frequency loudspeaker propagated by the second low-frequency loudspeaker;

the audio content corresponding to the first component of the signal emitted by the second low-frequency loudspeaker propagated by the second low-frequency loudspeaker in the second zone interferes destructively with the audio content corresponding to the first component of the signal emitted by the first low-frequency loudspeaker propagated by the first low-frequency loudspeaker;

the audio content corresponding to the second signal component emitted by the first high-frequency loudspeaker array propagated by the first high-frequency loudspeaker array in the first zone interferes destructively with the audio content corresponding to the second signal component emitted by the second high-frequency loudspeaker array propagated by the second high-frequency loudspeaker array; and the audio content corresponding to the first signal component emitted by the second high-frequency loudspeaker array propagated by the second high-frequency loudspeaker array in the second zone interferes destructively with the audio content corresponding to the first signal component emitted by the first high-frequency loudspeaker array propagated by the first high-frequency loudspeaker array;

determination of a second objective matrix from the second propagation matrix by cancelling the transfer functions in the zones for which:

the audio content corresponding to the second component of the signal emitted by the first low-frequency loudspeaker propagated by the first low-frequency loudspeaker in the first zone interferes destructively with the audio content corresponding to the second component of the signal emitted by the second low-frequency loudspeaker propagated by the second low-frequency loudspeaker;

the audio content corresponding to the first component of the signal emitted by the second low-frequency loudspeaker propagated by the second low-frequency loudspeaker in the second zone interferes destructively with the audio content corresponding to the first component of the signal emitted by the first low-frequency loudspeaker propagated by the first low-frequency loudspeaker;

the audio content corresponding to the second signal component emitted by the first high-frequency loudspeaker array propagated by the first high-frequency loudspeaker array in the first zone interferes destructively with the audio content corresponding to the second signal component emitted by the second high-frequency loudspeaker array propagated by the second high-frequency loudspeaker array; and the audio content corresponding to the first signal component emitted by the second high-frequency loudspeaker array propagated by the second high-frequency loudspeaker array in the second zone interferes destructively with the audio content corresponding to the first signal component emitted by the first high-frequency loudspeaker array propagated by the first high-frequency loudspeaker array;

calculation of a first filter matrix corresponding to the product of the inverse matrix of the first propagation matrix and the first objective matrix, and calculation of a second filter matrix corresponding to the product of the inverse matrix of the second propagation matrix and the second objective matrix.

8. Method according to claim 7 wherein the method further comprises a step of calculating a common filter matrix from the first and second filter matrices.

9. Method according to claim 7 wherein the at least one filter matrix is selected from a set of filter matrices calculated for different control points or set of control points, as a function of the position of the user's head.

* * * * *